(12) United States Patent
Peters et al.

(10) Patent No.: US 12,047,764 B2
(45) Date of Patent: *Jul. 23, 2024

(54) MIXED-ORDER AMBISONICS (MOA) AUDIO DATA FOR COMPUTER-MEDIATED REALITY SYSTEMS

(71) Applicant: Qualcomm Incorporated, San Diego, CA (US)

(72) Inventors: Nils Günther Peters, San Diego, CA (US); Dipanjan Sen, Dublin, CA (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 295 days.

This patent is subject to a terminal disclaimer.

(21) Appl. No.: 16/557,798

(22) Filed: Aug. 30, 2019

(65) Prior Publication Data

US 2019/0387348 A1    Dec. 19, 2019

Related U.S. Application Data

(63) Continuation of application No. 15/672,058, filed on Aug. 8, 2017, now Pat. No. 10,405,126.

(Continued)

(51) Int. Cl.
*H04S 7/00* (2006.01)
*G06F 3/01* (2006.01)
(Continued)

(52) U.S. Cl.
CPC .............. *H04S 7/303* (2013.01); *G06F 3/013* (2013.01); *G06F 3/165* (2013.01); *G06F 3/167* (2013.01);
(Continued)

(58) Field of Classification Search
CPC ....... G10L 19/00; G10L 19/008; G10L 25/21; G10L 19/12
See application file for complete search history.

(56) References Cited

U.S. PATENT DOCUMENTS 5,757,927 A * 5/1998 Gerzon ..................... H04S 3/02
381/18
8,379,868 B2 * 2/2013 Goodwin .............. G10L 19/008
381/23

(Continued)

FOREIGN PATENT DOCUMENTS

CN    106714072 A    5/2017
CN    106714073 A    5/2017

(Continued)

OTHER PUBLICATIONS

"3rd Generation Partnership Project; Technical Specification Group Services and System Aspects; Virtual Reality (VR) media services over 3GPP; (Release 14)", 3gpp Draft; S4-170413 TR 26.918 Virtual Reality (VR) Media Services Over 3GPP v0.6.0 RM,_ 3rd Generation Partnership Project (3GPP), Mobile Competence Centre ; 650, Route Des Lucioles ; F-06921 Sophia-A , Apr. 28, 2017 (Apr. 28, 2017), XP051259891, Retrieved from the Internet: URL:http://www.3gpp.org/ftp/Meetings_3GPP SYNC/SA4/Docs/[retrieved on Apr. 28, 2017], 61 pages.

(Continued)

*Primary Examiner* — Olga V Merkoulova
(74) *Attorney, Agent, or Firm* — QUALCOMM Incorporated; Espartaco Diaz Hidalgo

(57) ABSTRACT

An example device includes a memory configured to store a plurality of representations of a soundfield, each representation of the soundfield comprising a different set of ambisonic coefficients representative of the same soundfield at concurrent periods of time. The device also includes a processor, coupled to the memory, and the processor is (Continued)

configured to perform audio playback based on a field of view and on a particular representation of the soundfield from the plurality of representations.

24 Claims, 19 Drawing Sheets

Related U.S. Application Data

(60) Provisional application No. 62/527,769, filed on Jun. 30, 2017.

(51) Int. Cl.
  *G06F 3/16* (2006.01)
  *H04R 1/02* (2006.01)
  *H04R 1/40* (2006.01)
  *H04S 3/00* (2006.01)
  *G06T 19/00* (2011.01)

(52) U.S. Cl.
  CPC ............ *H04R 1/028* (2013.01); *H04R 1/406* (2013.01); *H04S 3/008* (2013.01); *G06T 19/006* (2013.01); *H04R 2420/07* (2013.01); *H04S 2400/11* (2013.01); *H04S 2400/15* (2013.01); *H04S 2420/11* (2013.01)

(56) References Cited

U.S. PATENT DOCUMENTS

| | | | |
|---|---|---|---|
| 8,488,824 B2* | 7/2013 | Mouhssine | G10L 19/008 381/94.2 |
| 9,237,398 B1 | 1/2016 | Algazi et al. | |
| 9,466,121 B2 | 10/2016 | Yang et al. | |
| 9,852,737 B2 | 12/2017 | Kim et al. | |
| 9,854,377 B2 | 12/2017 | Sen et al. | |
| 9,922,656 B2 | 3/2018 | Peters et al. | |
| 10,405,126 B2* | 9/2019 | Peters | G06F 3/013 |
| 10,728,689 B2 | 7/2020 | Swaminathan et al. | |
| 10,924,876 B2 | 2/2021 | Swaminathan et al. | |
| 11,089,428 B2 | 8/2021 | Salehin et al. | |
| 11,356,793 B2 | 6/2022 | Salehin et al. | |
| 11,743,670 B2 | 8/2023 | Salehin et al. | |
| 2004/0076301 A1 | 4/2004 | Algazi et al. | |
| 2006/0045275 A1* | 3/2006 | Daniel | G10H 1/0091 381/17 |
| 2007/0239295 A1* | 10/2007 | Thompson | G10L 19/265 704/E19.01 |
| 2008/0144864 A1* | 6/2008 | Huon | H04R 5/02 381/305 |
| 2010/0305952 A1 | 12/2010 | Mouhssine et al. | |
| 2011/0249821 A1 | 10/2011 | Jaillet et al. | |
| 2012/0230497 A1* | 9/2012 | Dressler | H04S 3/02 381/22 |
| 2012/0314878 A1* | 12/2012 | Daniel | G10L 19/20 381/23 |
| 2013/0010971 A1 | 1/2013 | Batke et al. | |
| 2013/0216070 A1 | 8/2013 | Keiler et al. | |
| 2013/0236039 A1* | 9/2013 | Jax | H04R 5/00 381/307 |
| 2013/0259312 A1* | 10/2013 | Lyons | H04N 21/44218 382/103 |
| 2014/0023197 A1* | 1/2014 | Xiang | G10L 19/008 381/17 |
| 2014/0025386 A1* | 1/2014 | Xiang | G10L 19/00 704/500 |
| 2015/0055808 A1* | 2/2015 | Vennstrom | G06F 3/013 381/307 |
| 2015/0117664 A1 | 4/2015 | Mossner et al. | |
| 2015/0213805 A1* | 7/2015 | Peters | H04S 7/30 704/500 |
| 2015/0264483 A1 | 9/2015 | Morrell et al. | |
| 2015/0271621 A1* | 9/2015 | Sen | H04S 7/30 381/303 |
| 2015/0373471 A1 | 12/2015 | Krueger et al. | |
| 2016/0007132 A1 | 1/2016 | Peters et al. | |
| 2016/0088415 A1* | 3/2016 | Krueger | H04S 3/008 381/22 |
| 2016/0093308 A1* | 3/2016 | Kim | H04R 5/00 381/22 |
| 2016/0093311 A1* | 3/2016 | Kim | H04S 3/008 381/22 |
| 2016/0099001 A1 | 4/2016 | Peters et al. | |
| 2016/0104495 A1* | 4/2016 | Peters | G10L 19/008 381/22 |
| 2016/0155448 A1* | 6/2016 | Purnhagen | G10L 19/06 704/204 |
| 2016/0174008 A1* | 6/2016 | Boehm | H04S 7/301 381/22 |
| 2016/0212538 A1* | 7/2016 | Fullam | H04S 7/40 |
| 2016/0227340 A1* | 8/2016 | Peters | H04S 3/008 |
| 2016/0241980 A1 | 8/2016 | Najaf-Zadeh et al. | |
| 2016/0309273 A1 | 10/2016 | Keiler et al. | |
| 2017/0011751 A1 | 1/2017 | Fueg et al. | |
| 2017/0132480 A1 | 5/2017 | Han | |
| 2017/0188170 A1 | 6/2017 | Prins et al. | |
| 2018/0046431 A1 | 2/2018 | Thagadur Shivappa et al. | |
| 2018/0190300 A1 | 7/2018 | Mate et al. | |
| 2018/0206057 A1 | 7/2018 | Kim et al. | |
| 2018/0332420 A1 | 11/2018 | Salume et al. | |
| 2018/0338213 A1 | 11/2018 | Lehtiniemi et al. | |
| 2019/0007781 A1* | 1/2019 | Peters | G06F 3/167 |
| 2019/0180509 A1 | 6/2019 | Laaksonen et al. | |
| 2019/0198028 A1 | 6/2019 | Kim et al. | |
| 2019/0200158 A1 | 6/2019 | Verbeke et al. | |
| 2019/0306651 A1 | 10/2019 | Vilermo et al. | |
| 2019/0335292 A1 | 10/2019 | Leppanen et al. | |
| 2020/0021940 A1 | 1/2020 | Choueiri et al. | |
| 2020/0068335 A1 | 2/2020 | Eronen et al. | |
| 2020/0264006 A1 | 8/2020 | Sommer et al. | |
| 2021/0004201 A1 | 1/2021 | Munoz et al. | |
| 2021/0004452 A1 | 1/2021 | Swaminathan et al. | |
| 2021/0006922 A1 | 1/2021 | Swaminathan et al. | |
| 2021/0092546 A1 | 3/2021 | Terentiv et al. | |
| 2021/0160645 A1 | 5/2021 | Olivieri et al. | |
| 2021/0168550 A1 | 6/2021 | Terentiv et al. | |

FOREIGN PATENT DOCUMENTS

| | | |
|---|---|---|
| EP | 3410747 A1 | 12/2018 |
| EP | 3506082 A1 | 7/2019 |
| WO | 2014001478 A1 | 1/2014 |
| WO | 2014042795 A2 | 3/2014 |
| WO | 2014194099 A1 | 12/2014 |
| WO | 2015116666 | 8/2015 |
| WO | 2015175981 | 11/2015 |
| WO | 2018064528 A1 | 4/2018 |
| WO | 2019197403 A1 | 10/2019 |

OTHER PUBLICATIONS

Audio, "Call for Proposals for 3D Audio," International Organisation for Standardisation Organisation Internationale De Normalisation ISO/IEC JTC1/SC29/WG11 Coding of Moving Pictures and Audio, ISO/IEC JTC1/SC29/WG11/N13411, Geneva, Jan. 2013, pp. 1-20.

"Digital Audio" Wikipedia, the free encyclopedia, retrieved from https://en.wikipedia.org/wiki/Digital_audio, Oct. 18, 2017, 4 pp.

"Digital Signal Processing" Wikipedia, the free encyclopedia, retrieved from https://en.wikipedia.org/wiki/Digital_signal_processing, Jun. 21, 2017, 12 pp.

Herre, et al., "MPEG-H 3D Audio—The New Standard for Coding of Immersive Spatial Audio, IEEE Journal of Selected Topics in Signal Processing," vol. 9, No. 5, Aug. 2015, 10 pp.

Hollerweger F., "An Introduction to Higher Order Ambisonic," Oct. 2008, pp. 13, Accessed online [Jul. 8, 2013] at.

"Information technology—High Efficiency Coding and Media Delivery in Heterogeneous Environments—Part 3: 3D Audio," ISO/IEC JTC 1/SC 29, ISO/IEC DIS 23008-3, Jul. 25, 2014, 433 Pages.

(56) References Cited

OTHER PUBLICATIONS

"Information technology—High efficiency coding and media delivery in heterogeneous environments—Part 3: 3D Audio," ISO/IEC JTC 1/SC 29N, ISO/IEC 23008-3; 201*(E), Oct. 12, 2016, 797 pp.
"Information technology—High efficiency coding and media delivery in heterogeneous environments—Part 3: 3D Audio," ISO/IEC JTC 1/SC 29N, Apr. 4, 2014, 337 pp.
"Information technology—High efficiency coding and media delivery in heterogeneous environments—Part 3: 3D Audio," ISO/IEC JTC 1/SC 29N, Jul. 25, 2005, 311 pp.
"Information technology—High efficiency coding and media delivery in heterogeneous environments—Part 3: Part 3: 3D Audio, Amendment 3: MPEG-H 3D Audio Phase 2," ISO/IEC JTC 1/SC 29N, Jul. 25, 2015, 208 pp.
International Search Report and Written Opinion—PCT/US2018/034196—ISA/EPO—dated Jul. 23, 2018.
Marschall M., et al., "Sound-Field Reconstruction Performance of a Mixed-Order Ambisonics Microphone Array", Proceedings of Meetings on Acoustics, vol. 19, No. 1, 2013, pp. 1-2.
Poletti M., "Three-Dimensional Surround Sound Systems Based on Spherical Harmonics," The Journal of the Audio Engineering Society, Nov. 2005, vol. 53 (11), pp. 1004-1025.
Schonefeld V., "Spherical Harmonics," Jul. 1, 2005, XP002599101, 25 Pages, Accessed online [Jul. 9, 2013] at URL:http://videoarch1.s-inf.de/~volker/prosem_paper.pdf.
Sen D., et al., "RM1-HOA Working Draft Text", 107. MPEG Meeting; Jan. 13, 2014-Jan. 17, 2014; San Jose; (Motion Picture Expert Group or ISO/IEC JTC1/SC29/WG11), No. m31827, Jan. 11, 2014 (Jan. 11, 2014), 86 Pages, XP030060280.
Sen D., et al., "Technical Description of the Qualcomm's HoA Coding Technology for Phase II", 109. MPEG Meeting; Jul. 7, 2014-Jul. 11, 2014; Sapporo; (Motion Picture Expert Group or ISO/IEC JTC1/SC29/WG11), No. m34104, Jul. 2, 2014 (Jul. 2, 2014), XP030062477, figure 1.
International Preliminary Report on Patentability—PCT/US2018/034196—ISA/EPO—dated Jan. 9, 2020 8 pgs.
ETSI TS 103 589 V1.1.1, "Higher Order Ambisonics (HOA) Transport Format", Jun. 2018, 33 pages.
ISO/IEC JTC 1/SC 29/WG 6, "MPEG-I Immersive Audio Encoder Input Format, Version 3", International Organization for Standardization ISO/IEC JTC1/SC29/WG6, MPEG Audio Coding, ISO/IEC JTC1/SC29/WG6 N0169, Oct. 2022, Hybrid Mainz & Virtual, 38 pages.
Joseph T., et al., "Performance of Linear Extrapolation Methods for Virtual Sound Field Navigation", Journal of the Audio Engineering Society, vol. 68, No. 3, Mar. 1, 2020 (Mar. 1, 2020 ), pp. 138-156, XP055909731, US ISSN: 1549-4950, DOI: 10.17743/jaes.2019.

0054, Retrieved from the Internet: URL: https://www.aes.org/tmpFiles/elib/20220406/20725.pdf pp. 138-144.
Jurgen H., "MPEG-H Audio—The New Standard for Universal Spatial/3D Audio Co", JAES, AES, 60 East 42nd Street, Room 2520 New York, 10165-2520, USA, vol. 62, No. 12, Jan. 5, 2015 (Jan. 5, 2015), pp. 821-830, XP040670747, 12 pages, pp. 3, 4 pp. 8, 9.
Kronlachner M., et al., "Spatial Transformations for the Enhancement of Ambisonic Recordings", Jan. 2014, 5 pages.
Marsden J.E., and Tromba A.J., Vector Calculus, Macmillan, 2003, 5 pages. (Applicant points out, in accordance with MPEP 609.04(a), that the year of publication, 2003, is sufficiently earlier than the effective U.S. filing date, so that the particular month of publication is not an issue.).
Munoz I., "Proposed 6DoF HOA Scenes", International Organisation for Standardisation ISO/IEC JTC1/SC29/WG6, MPEG Audio Coding, ISO/IEC JTC1/SC29/WG6 M61160, Oct. 2022, Mainz, 5 Pages.
Peterson J., et al., "Virtual Reality, Augmented Reality, and Mixed Reality Definitions", EMA, version 1.0, Jul. 7, 2017, 4 Pages.
Pomberger H., et al., "Warping of 3D Ambisonic Recordings", Ambisonic Symposium 2011, Jun. 2, 2011 (Jun. 2, 2011), XP055014360, pp. 1-8, Lexington, pp. 1,4.
Salehin A., (Qualcomm) et al., "6DOF Processing for HOA Content", 120. MPEG Meeting, Oct. 23, 2017-Oct. 27, 2017, MACAU, (Motion Picture Expert Group or ISO/IEC JTC1/SC29/WG11), No. M41734, Oct. 19, 2017 (Oct. 19, 2017), XP030070076, 4 Pages, [Retrieved on Oct. 19, 2017].
Salehin S.M.A., et al., "Thoughts on Rendering Interior Ambisonic Sound Fields", Coding of Moving Pictures and Audio, ISO/IEC JTC1/SC29/WG11 MPEG2019/M49394, Jul. 2019, Gothenburg, Sweden, 3 Pages.
The Wayback Machine: "Inverse Square Law, Sound", Retrieved on Sep. 15, 2023, , Hyperphysics, 2000, pp. 1-3. (Applicant points out, in accordance with MPEP 609.04(a), that the year of publication, 2003, is sufficiently earlier than the effective U.S. filing date, so that the particular month of publication is not an issue.).
Tylka et al., "Soundfield Navigation using an Array of Higher-Order Ambisonics Microphones", Conference: 2016 AES International Conference on Audio for Virtual and Augmented Reality, Audio Engineering Society, Conference Paper, Presented at the Conference on Audio for Virtual and Augmented Reality, Sep. 30-Oct. 1, 2016, Los Angeles, CA, USA, XP040681032, pp. 1-5, pp. 1-10.
WG11: "Proposed Draft 1.0 of TR: Technical Report on Architectures for Immersive Media", ISO/IEC JTC1/SC29/WG11/N17685, San Diego, US, Apr. 2018, 14 pages.
Zotter F., et al., "Warping of the Recording Angle in Ambisonics", Jan. 2011, 4 Pages.

* cited by examiner

MIXED-ORDER AMBISONICS (MOA) AUDIO DATA FOR COMPUTER-MEDIATED REALITY SYSTEMS

This application is a continuation of:

U.S. Non Provisional application Ser. No. 15/672,058, entitled "MIXED-ORDER AMBISONICS (MOA) AUDIO DATA FOR COMPUTER-MEDIATED REALITY SYSTEMS," filed on 8 Aug. 2017; which claims the benefit of the following U.S. Provisional Application No. 62/527,769, entitled "MEASURING SPHERICAL IMAGE QUALITY METRICS BASED ON USER FIELD OF VIEW," filed on 30 Jun. 2017, the entire contents of which are hereby incorporated by reference.

TECHNICAL FIELD

This disclosure relates to processing of media data, such as audio data.

BACKGROUND

A higher-order ambisonics (HOA) signal (often represented by a plurality of spherical harmonic coefficients (SHC) or other hierarchical elements) is a three-dimensional representation of a soundfield. The HOA or SHC representation may represent the soundfield in a manner that is independent of the local speaker geometry used to playback a multi-channel audio signal rendered from the SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a soundfield that also accommodates backward compatibility.

SUMMARY

This disclosure relates generally to auditory aspects of the user experience of computer-mediated reality systems, including virtual reality (VR), mixed reality (MR), augmented reality (AR), computer vision, and graphics systems. In some particular examples, aspects of this disclosure are directed to the selection, streaming, and playback, of audio content that accompanies the corresponding video content of the computer-mediated sensory input data of the computer-mediated reality system.

In one example, a device includes a memory device configured to store a plurality of representations of a soundfield. In this example, the device also includes a processor coupled to the memory device. The processor is configured to track a steering angle provided by one or more angles associated with the device, and to select, based on the steering angle, a representation of the soundfield from the plurality of representations stored to the memory device.

In another example, a method includes tracking, by a processor, a steering angle provided by one or more angles associated with a device. The method further includes selecting, by the processor and based on the steering angle, a representation of a soundfield from a plurality of representations of a soundfield that are stored to a memory device that is coupled to the processor.

In another example, an apparatus includes means for storing a plurality of representations of a soundfield, means for tracking a steering angle provided by one or more angles associated with the apparatus, and means for selecting, based on the steering angle, a representation of the soundfield from the stored plurality of representations.

In another example, a non-transitory computer-readable storage medium is encoded with instructions that, when executed, cause a processor of a device to track a steering angle provided by one or more angles associated with the device, and to select, based on the steering angle, a representation of a soundfield from a plurality of representations of a soundfield that are stored to the non-transitory computer-readable storage medium.

The details of one or more examples of this disclosure are set forth in the accompanying drawings and the description below. Other features, objects, and advantages will be apparent from the description and drawings, and from the claims.

DETAILED DESCRIPTION

Figure 1:
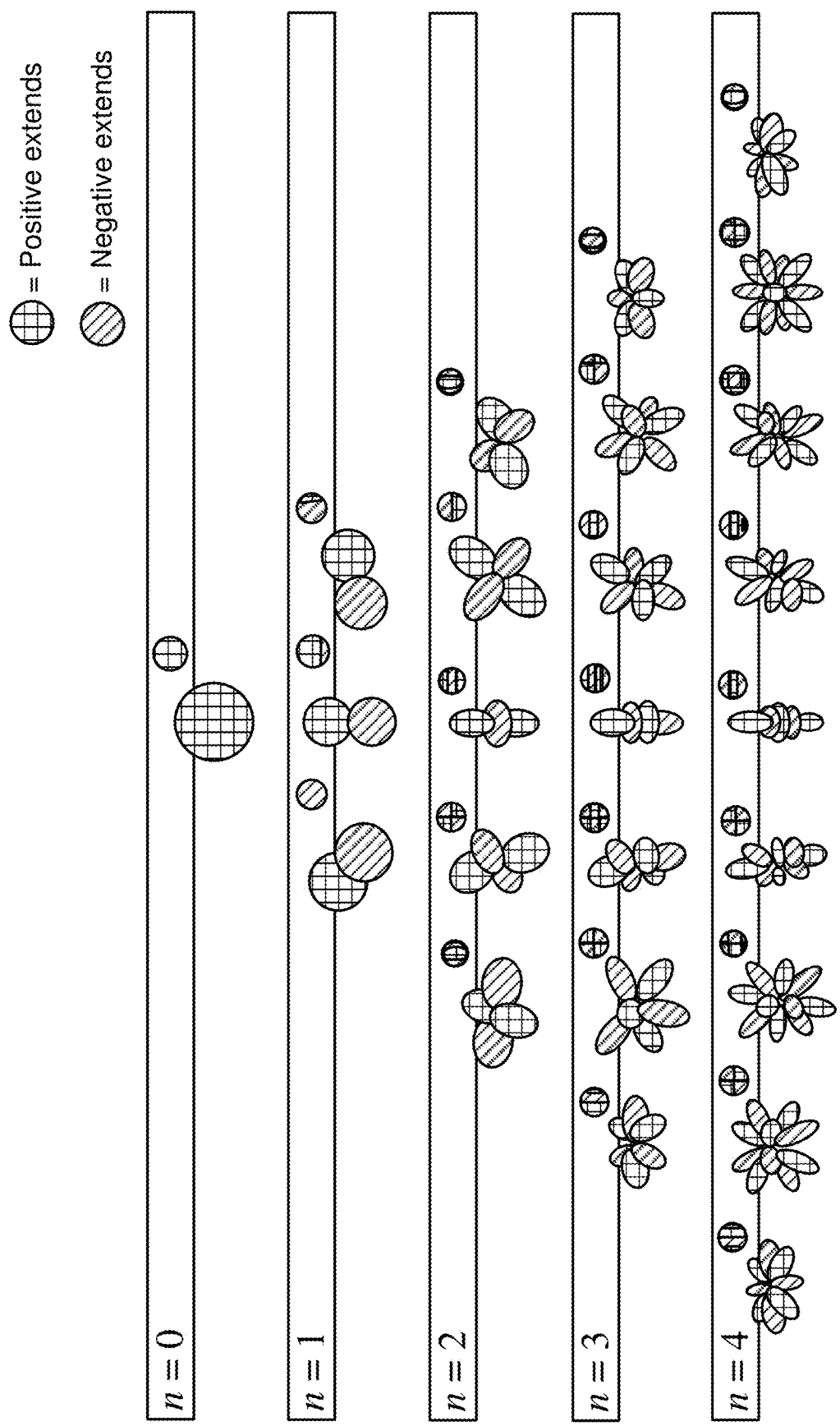
FIG. 1 is a diagram illustrating spherical harmonic basis functions of various orders and sub-orders.

In general, this disclosure is directed to techniques for selecting soundfield representations for playback during a user experience of a computer-mediated reality system. Computer-mediated reality technology includes various types of content-generating and content-consuming systems, such as virtual reality (VR), mixed reality (MR), augmented reality (AR), computer vision, and graphics systems. While several aspects of this disclosure are described with respect to virtual reality systems for ease of discussion by way of example, it will be appreciated that the techniques of this disclosure are also applicable to other types of computer-mediated reality technology, such as mixed reality, augmented reality, computer vision, and graphics systems.

Virtual reality systems may leverage a user's field of view (FoV) information to edit and output spherical video data that is customized to serve the user's FoV. Spherical video data refers to video data that partially or fully surrounds a viewer's head, e.g., for virtual reality applications or other similar scenarios in which a user may move his or her head to see different parts of an image canvas that cannot be seen when directing focus at a single point of the canvas. In particular, these techniques may be applied when the viewer directs visual focus to a particular portion of a large canvas, such as a three-dimensional canvas that partially or fully envelops the viewer's head. Spherical video data that envelops a user's head may be provided using a combination of screens (e.g., a set of screens that surround the user) or via head-mounted optics.

Examples of hardware that can provide head-mounted optics include VR headsets, MR headsets, AR headsets, and various others. Sensing data and/or test data may be used to determine the users' FoV. As one example of sensing data, one or more angles associated with the positioning of a VR headset, which form a "steering angle" of the headset, may indicate the user's FoV. As another example of sensing data, a gaze angle of the user (sensed, for example, via iris detection) may indicate the user's FoV.

The spherical video data and the corresponding audio data may be encoded and prepared (e.g., for storage and/or transmission) using a set of characteristics. With respect to spherical video data, the data may be encoded and prepared using characteristics such as spatial resolutions for different regions of the canvas, bitrates for different regions of the 3D canvas (which may be achieved using various quantization parameters), or the like. For instance, the spherical video data may be upsampled at one or more surfaces of the 3D canvas that are in the user's FoV, to enhance the visual aspects of the user experience.

Existing VR systems, however, do not encode different representations of the corresponding soundfield to suit the user's FoV. For instance, many "state of the art" VR systems render and play back a full HOA representation of the 3D soundfield throughout the VR experience. As such, the existing VR systems provide fully directional 3D audio throughout a VR experience. Thus, while existing VR systems provide high quality directional audio playback throughout the duration of a VR user experience, the existing VR systems may consume greater computing resources to sustain the fully directional 3D audio feed for the entire duration of the VR experience. Moreover, existing VR systems do not customize the audio playback to suit the user's FoV at any time.

This disclosure is directed to techniques for selecting a soundfield representation based on the user's FoV. Systems of this disclosure may store or otherwise have access to multiple representations of the same soundfield, which is associated with the current VR experience. In turn, the systems of this disclosure may detect the user's FoV and select the particular soundfield representation that provides fully directional audio data for audio objects associated with video objects that are in the user's FoV, and provide less directional audio data for audio objects associated with video objects that are outside of the user's FoV.

The techniques of this disclosure may be used in conjunction with techniques related to transmission (e.g., sending and/or receiving) of media data (such as video data and audio data) coded at various levels of quality for different regions at which the media data is to be played back. For example, the techniques of this disclosure may be used by a client device that includes a panoramic display (e.g., a display that partially or fully envelopes a viewer) and surround sound speakers. In general, the display is configured such that a visual focus of a user is directed to only a portion of the display at a given time. The systems of this disclosure may render and output the audio data via the surround sound speakers such that audio objects associated with the present area of focus on the display are output with greater directionality than the remaining audio objects.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the soundfield. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the soundfield corresponding to an individual audio object may be expressed as:

$$A_n^m(k) = g(\omega)(-4\pi i k) h_n^{(2)}(k r_s) Y_n^{m*}(\theta_s, \varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the soundfield (the pressure as a function of 3D coordinates), and the above represents the transformation from individual objects to a representation of the overall soundfield, in the vicinity of the observation point $\{r_r, \theta_r, \varphi_r\}$. The remaining figures are described below in the context of object-based and SHC-based audio coding.

Figure 2:
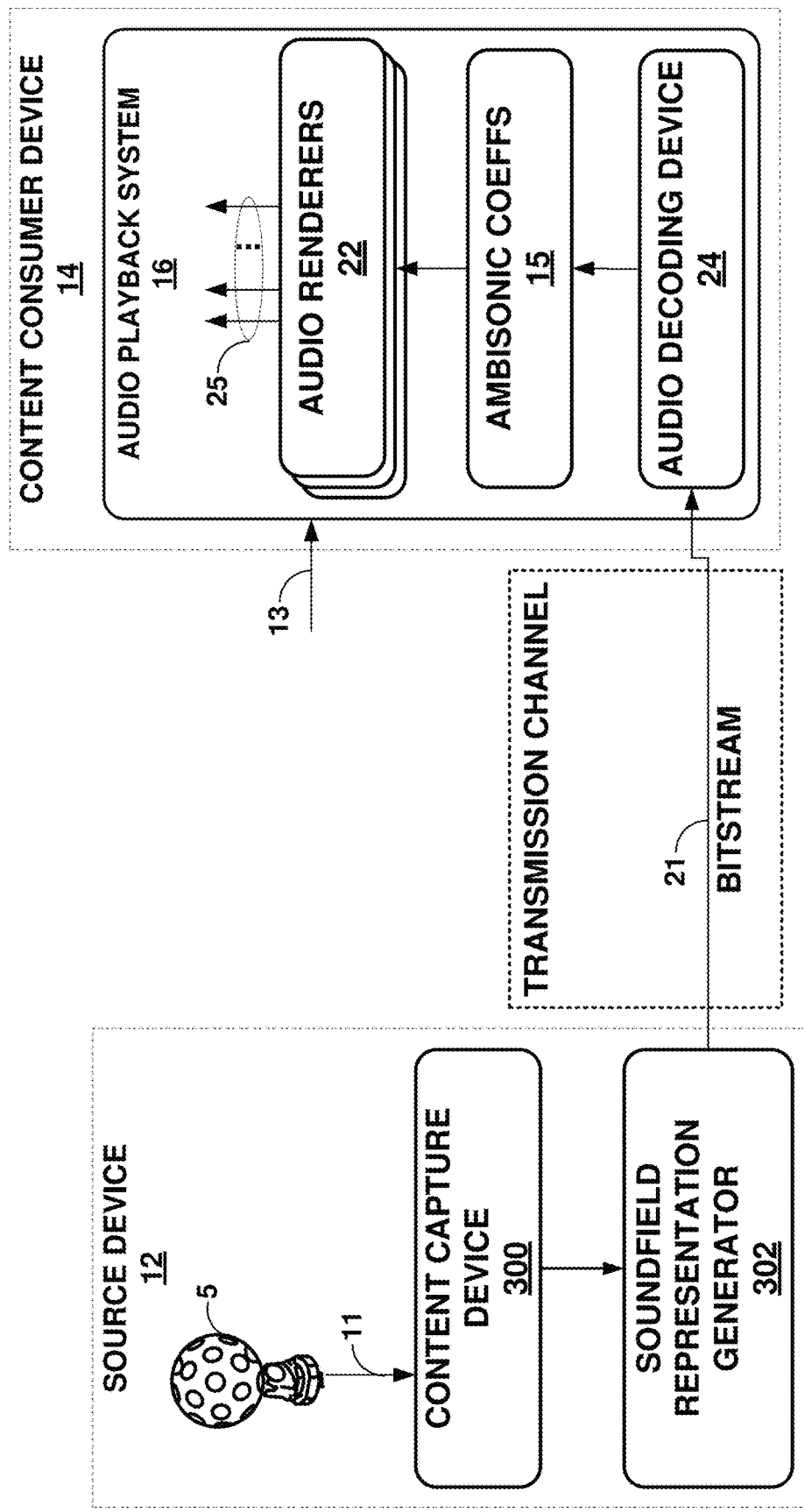
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a source device 12 and a content consumer device 14. While described in the context of the source device 12 and the content consumer device 14, the techniques may be implemented in any context in which any hierarchical representation of a soundfield is encoded to form a bitstream representative of the audio data. Moreover, the source device 12 may represent any form of computing device capable of generating hierarchical representation of a soundfield, and is generally described herein in the context of being a VR content creator device. Likewise, the content consumer device 14 may represent any form of computing device capable of implementing the soundfield representation selection techniques described in this disclosure as well as audio playback, and is generally described herein in the context of being a VR client device.

The source device 12 may be operated by an entertainment company or other entity that may generate multichannel audio content for consumption by operators of content consumer devices, such as the content consumer device 14. In many VR scenarios, the source device 12 generates audio content in conjunction with video content. The source device 12 includes a content capture device 300 and a content capture assistant device 302. The content capture device 300 may be configured to interface or otherwise communicate with a microphone 5. The microphone 5 may represent an Eigenmike® or other type of 3D audio microphone capable of capturing and representing the soundfield as HOA coefficients 11. The content capture device 300 may, in some examples, include an integrated microphone 5 that is integrated into the housing of the content capture device 300. In some examples, the content capture device 300 may interface wirelessly or via a wired connection with the microphone 5. In other examples, the content capture device 300 may process HOA coefficients 11 that after HOA coefficients 11 are input via some type of removable storage. Various combinations of the content capture device 300 and the microphone 5 are possible in accordance with this disclosure.

The content capture device 300 may also be configured to interface or otherwise communicate with the soundfield representation generator 302. The soundfield representation generator 302 may include any type of hardware device capable of interfacing with the content capture device 300. The soundfield representation generator 302 may use HOA coefficients 11 provided by the content capture device 300 to generate various representations of the same soundfield represented by the HOA coefficients 11. For instance, to generate the different representations of the soundfield using the HOA coefficients 11, soundfield representation generator 302 may use a coding scheme for ambisonic representations of a soundfield, referred to as Mixed Order Ambisonics (MOA).

To generate a particular MOA representation of the soundfield, the soundfield representation generator 302 may generate a partial subset of the full set of HOA coefficients 11. For instance, each MOA representation generated by the soundfield representation generator 302 may provide precision with respect to some areas of the soundfield, but less precision in other areas. In one example, an MOA representation of the soundfield may include eight (8) uncompressed HOA coefficients of the HOA coefficients 11, while the third order HOA representation of the same soundfield may include sixteen (16) uncompressed HOA coefficients of the HOA coefficients 11. As such, each MOA representation of the soundfield that is generated as a partial subset of the HOA coefficients 11 may be less storage-intensive and less bandwidth intensive (if and when transmitted as part of the bitstream 21 over the illustrated transmission channel) than the corresponding third order HOA representation of the same soundfield generated from the HOA coefficients 11.

The MOA representations of the soundfield generated by the soundfield representation generator 302 may be particularly useful in the context of VR content generation, transmission, and consumption. For instance, a VR client device, such as the content consumer device 14 can provide greater precision with respect to soundfield areas that correspond to a video viewport corresponding to the direction of the user's FoV. For instance, the content consumer device 14 can use the steering angle of a VR headset to determine the user's FoV, and thereby determine locations within the soundfield to be provided at greater precision. In various examples of this disclosure, one or both of the source device 12 and/or the content consumer device 14 may store multiple MOA representations of the soundfield, as generated by the soundfield representation generator 302.

The content capture device 300 may, in some examples, be configured to wirelessly communicate with the soundfield representation generator 302. In some examples, the content capture device 300 may communicate, via one or both of a wireless connection or a wired connection, with the soundfield representation generator 302. Via the connection between the content capture device 300 and the soundfield representation generator 302, the content capture device 300 may provide content in various forms of content, which, for purposes of discussion, are described herein as being portions of the HOA coefficients 11.

In some examples, the content capture device 300 may leverage various aspects of the soundfield representation generator 302 (in terms of hardware or software capabilities of the soundfield representation generator 302). For example, the soundfield representation generator 302 may include dedicated hardware configured to (or specialized software that when executed causes one or more processors to) perform psychoacoustic audio encoding (such as a unified speech and audio coder denoted as "USAC" set forth by the Motion Picture Experts Group (MPEG) or the MPEG-H 3D audio coding standard). The content capture device 300 may not include the psychoacoustic audio encoder dedicated hardware or specialized software and instead provide audio aspects of the content 301 in a non-psychoacoustic-audio-coded form. The soundfield representation generator 302 may assist in the capture of content 301 by, at least in part, performing psychoacoustic audio encoding with respect to the audio aspects of the content 301.

The soundfield representation generator 302 may also assist in content capture and transmission by generating one or more bitstreams 21 based, at least in part, on the audio content (e.g., MOA representations and/or third order HOA representations) generated from the HOA coefficients 11. The bitstream 21 may represent a compressed version of the HOA coefficients 11 (and/or the partial subsets thereof used to form MOA representations of the soundfield) and any other different types of the content 301 (such as a compressed version of spherical video data, image data, or text data). The soundfield representation generator 302 may generate the bitstream 21 for transmission, as one example, across a transmission channel, which may be a wired or wireless channel, a data storage device, or the like. The bitstream 21 may represent an encoded version of the HOA coefficients 11 (and/or the partial subsets thereof used to form MOA representations of the soundfield) and may include a primary bitstream and another side bitstream, which may be referred to as side channel information.

The content consumer device 14 may be operated by an individual, and may represent a VR client device in many examples. The content consumer device 14 may include an audio playback system 16, which may refer to any form of audio playback system capable of rendering SHC (whether in form of third order HOA representations and/or MOA representations) for playback as multi-channel audio content.

While shown in FIG. 2 as being directly transmitted to the content consumer device 14, the source device 12 may output the bitstream 21 to an intermediate device positioned between the source device 12 and the content consumer device 14. The intermediate device may store the bitstream 21 for later delivery to the content consumer device 14, which may request the bitstream. The intermediate device may comprise a file server, a web server, a desktop computer, a laptop computer, a tablet computer, a mobile phone, a smart phone, or any other device capable of storing the bitstream 21 for later retrieval by an audio decoder. The intermediate device may reside in a content delivery network capable of streaming the bitstream 21 (and possibly in conjunction with transmitting a corresponding video data bitstream) to subscribers, such as the content consumer device 14, requesting the bitstream 21.

Alternatively, the source device 12 may store the bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

As further shown in the example of FIG. 2, the content consumer device 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing soundfield synthesis. As used herein, "A and/or B" means "A or B", or both "A and B".

The audio playback system 16 may further include an audio decoding device 24. The audio decoding device 24 may represent a device configured to decode ambisonic coefficients 15 (which may form the full third order HOA representation or a subset thereof that forms an MOA representation of the same soundfield) from the bitstream 21. As such, the ambisonic coefficients 15 may be similar to a full set or a partial subset of the HOA coefficients 11, but may differ due to lossy operations (e.g., quantization) and/or transmission via the transmission channel. The audio playback system 16 may, after decoding the bitstream 21 to obtain the Ambisonic coefficients 15 and render the Ambisonic coefficients 15 to output loudspeaker feeds 25. The loudspeaker feeds 25 may drive one or more loudspeakers (which are not shown in the example of FIG. 2 for ease of illustration purposes). Ambisonic representations of a soundfield may be normalized in a number of ways, including N3D, SN3D, FuMa, N2D, or SN2D.

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances or in conjunction with the dynamic determination of the loudspeaker information 13, the audio playback system 16 may prompt a user to interface with the audio playback system 16 and input the loudspeaker information 13.

The audio playback system 16 may then select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22. One or more speakers may then playback the rendered loudspeaker feeds 25.

According to some examples of this disclosure, the content consumer device 14 may store multiple MOA representations of the same soundfield, such that each MOA representation emphasizes precision at a different location or set of locations. In other examples of this disclosure, the content consumer device 14 may have access to a list of MOA representations of the same soundfield, that can be requested from the content creator device 12. In any of these examples, the content consumer device 14 may use the steering angle of a VR headset to which it is paired, to select a particular MOA representation that suits the user's current FoV. Based on the most recent steering angle information available from the VR headset, the content consumer device 14 may select or request the particular MOA representation that suits the user's current view-orientation. That is, the content consumer device 14 may select or request the particular MOA representation that provides precision with respect to audio objects that have locations that are within the user's FoV with respect to the corresponding spherical video data. Examples of steering-angle parameters include one or more angles with respect to the VR headset's orientation, such as one or more of a pitch, yaw, or roll angle of the VR headset's positioning and orientation.

Figure 3:
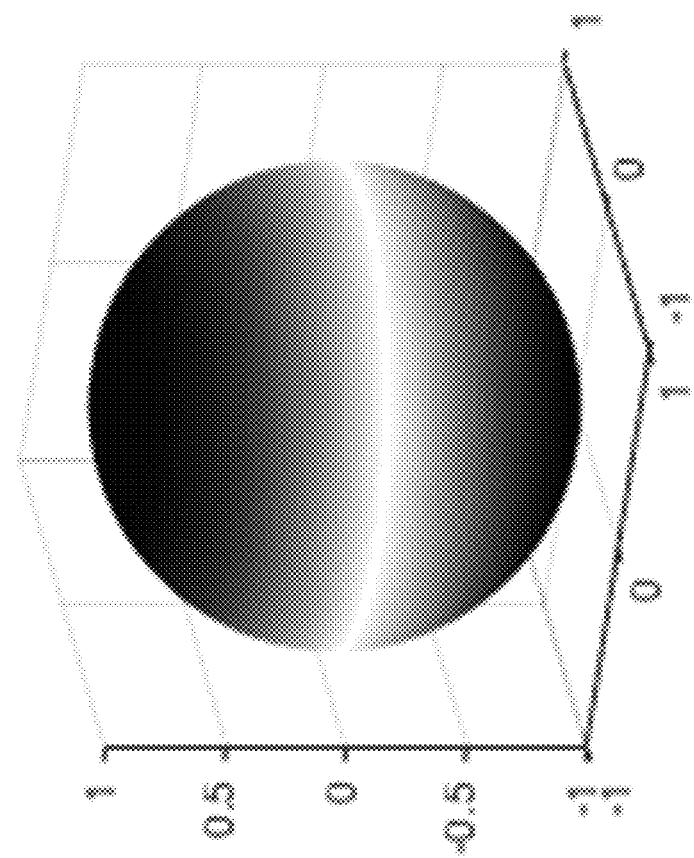
FIG. 3 is a diagram illustrating aspects of non-uniform spatial resolution distributions of a mixed order ambisonic representation of a soundfield.

FIG. 3 is a diagram illustrating aspects of non-uniform spatial resolution distributions of an MOA representation of a soundfield. Whereas a full spherical HOA has a uniformly high spatial resolution in all directions, an MOA representation of the same soundfield has a variable spatial resolution. In many cases, as in the example of FIG. 3, an MOA representation of a soundfield includes high resolution spatial audio data in the horizontal-only region, and includes lower resolution spatial audio data in the remaining regions of the soundfield. In the example illustrated in FIG. 3, the MOA representation of the soundfield includes a third order representation of the horizontal region (called out by a white band), and first order representations of all other regions (shown by the dark shaded-in portions). That is, according to the MOA representation of FIG. 3, as soon as a sound source leaves the equator of the soundfield, the sharpness and area of high quality reconstruction degrades rapidly with respect to audio objects emanating from the sound source.

Figure 4A:
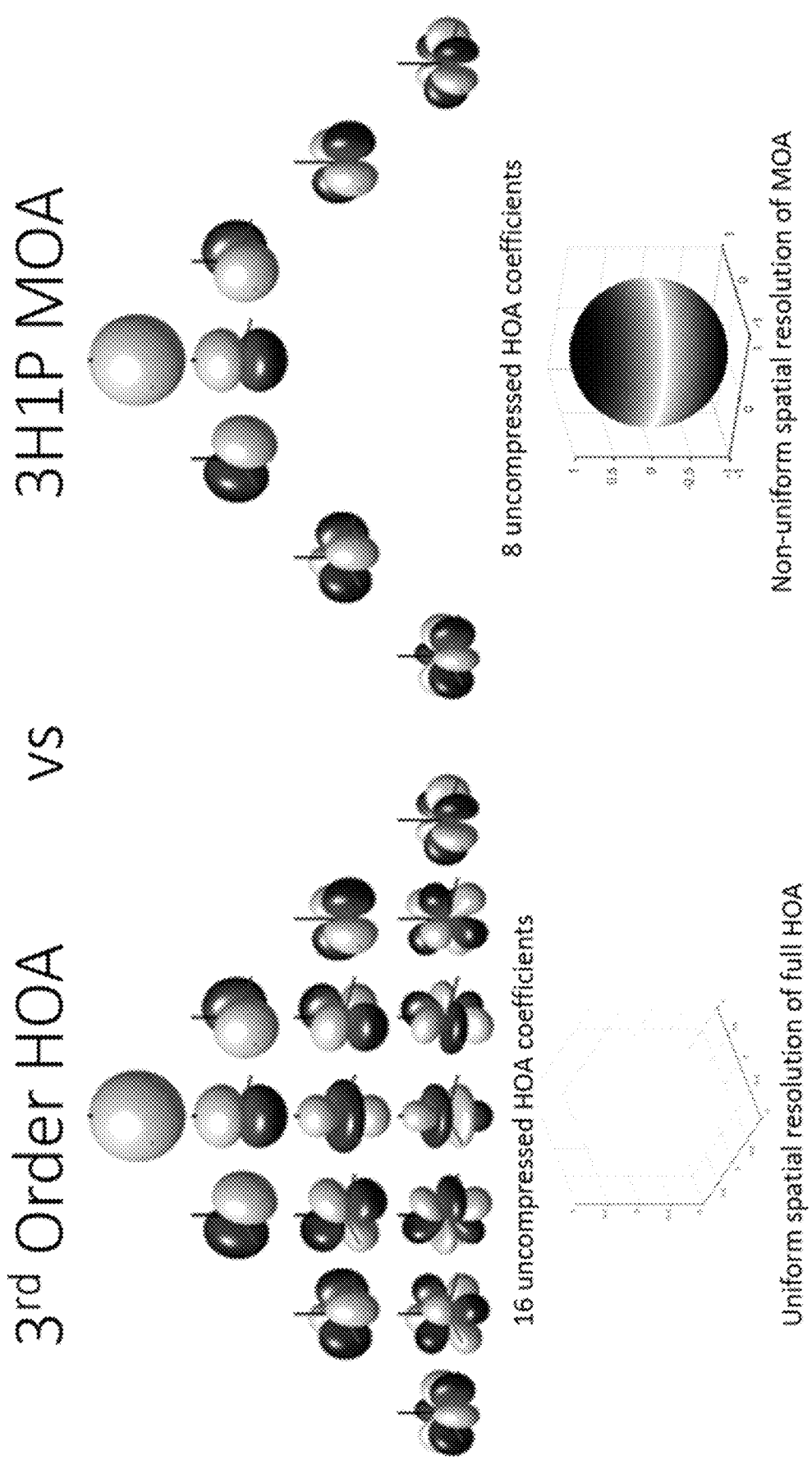
FIG. 4A is a diagram illustrating differences between a full third order HOA representation of a soundfield and a mixed order ambisonic representation of the same soundfield in which the horizontal region has a higher spatial resolution than the remaining regions.

FIG. 4A is a diagram illustrating differences between a full third order HOA representation of a soundfield and an MOA representation of the same soundfield in which the horizontal region has a higher spatial resolution than the remaining regions. As shown in FIG. 4, the full third order HOA representation includes sixteen (16) uncompressed HOA coefficients to represent the soundfield. The uniform spatial resolution of the full HOA representation is shown by the entire 3-axis plot being white (or appearing blank) with respect to the full third order HOA representation.

In contrast, the MOA representation includes eight (8) uncompressed HOA coefficients (or coefficient channels) with respect to the same soundfield. Moreover, in contrast to the uniform spatial resolution exhibited by the full third order HOA representation, the MOA representation shows a non-uniform spatial resolution in which the high spatial resolution occurs along the equator of the 3D soundfield, while the remaining regions of the soundfield are represented at a lower spatial resolution. The MOA representation illustrated in FIG. 4A is described as being a "3H1P" MOA representation, which indicates that the MOA representation includes a third order representation of the horizontal region and a first order representation of the remaining regions of the soundfield.

Figure 4B:
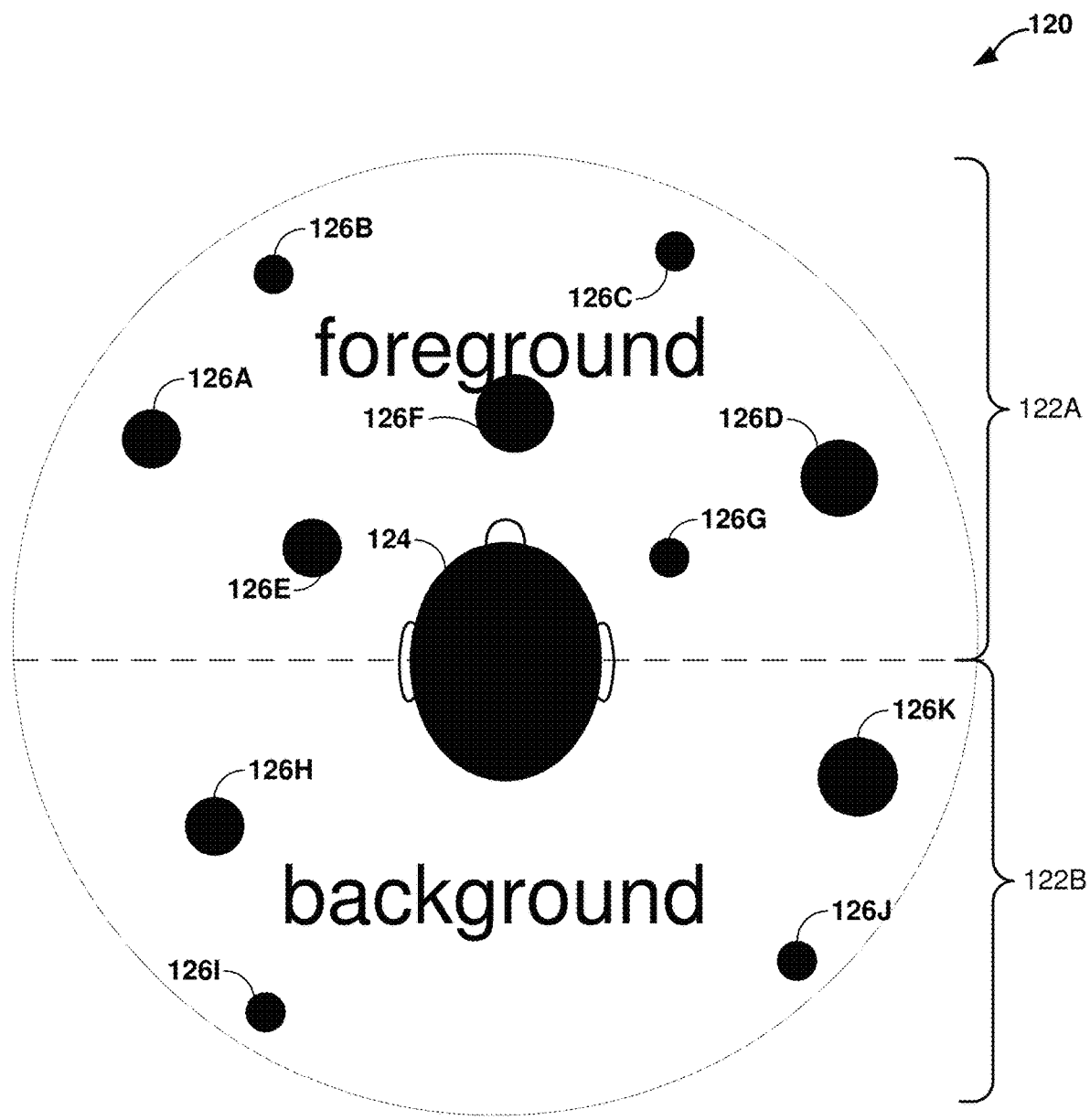
FIG. 4B is a diagram illustrating how various audio objects may be rendered in the foreground and background of multi-channel audio data in accordance with object-based representations of a soundfield.

FIG. 4B is a diagram illustrating how various audio objects 126A-126K may be rendered in the foreground and background of multi-channel audio data in accordance with object-based representations of a soundfield. The diagram of FIG. 4B specifies a view 120 that shows what is commonly referred to as the "sweet spot" from a top-down perspective or bird's eye view. The sweet spot refers to the location in a room where the surround sound experience is most optimal when the loudspeakers are properly configured for 5.1 or higher order surround sound playback. FIG. 4B illustrates various foreground objects and background objects of a soundfield. In general, foreground objects are more salient than the background objects. Techniques of this disclosure leverage MOA representations to emphasize the more-salient foreground objects while reducing coding and bandwidth for the less-salient background objects.

In the example of FIG. 4B, view 120 is segmented into two portions, which are denoted as foreground portion 122A and background portion 122B. Within the circle, a listener 124 is positioned (physically or virtually) in the middle of the sweet spot, on the horizontal access separating foreground portion 122A from background portion 122B. During playback of multi-channel audio data 40, listener 124 may hear audio objects 126A-126K in the sound field as presented in view 120. That is, audio objects 126A-126D appear, from the perspective of listener 124, to be originating from the more distant foreground. Audio objects 126A-126D may have been processed in the manner described above with respect to FIG. 2B by object association unit 26 with the result that assisted audio rendering unit 28A renders these in the far foreground as more diffuse audio objects due to the lack of any audio metadata.

Audio objects 126E-126G may appear, from the perspective of listener 124, to be originating in the more near foreground, as more focused objects. Audio objects 126E-126G may have been processed in the manner described above with respect to FIG. 2A by object association unit 26 with the result that assisted audio rendering unit 28A renders these in the more focused foreground due to ability of object association unit 26 to provide augmented metadata having high audio and video metadata correlation.

One or more of audio objects 126A-126G may be reference audio objects retrieved from a reference library in the manner described above with respect to computer-mediated reality systems, such as the functionalities described with respect to the soundfield representation generator 302 or the audio playback system 16. In this sense, object association unit 26 may identify those of video objects 32 that do not match any one of audio objects 34, passing these ones of video objects 32 to augmented reality audio rendering unit 28C as video objects 32'. Augmented reality audio rendering unit 28C may then retrieve one of reference audio objects 34''' that corresponds or matches one of video objects 32' and render this one of reference audio objects 34''' based on the video metadata included within the associated one of video objects 32'.

Audio objects 126H-126K may appear, form the perspective of listener 124, to be originating in the background. Audio objects 126H-126K may have been processed in the manner described above with respect to FIG. 2C by object association unit 26 with the result that unassisted audio rendering unit 28B renders these in the background due to inability of object association unit 26 to associate these audio objects 34" with any one of video objects 32. That is, because auditory scene analysis is typically not as precise in locating the origin of a sound in comparison to visual scene analysis, unassisted audio rendering unit 28B may be unable to accurately locate the source of audio objects 34". Unassisted audio rendering unit 28B may only render audio objects 34" based at most on corresponding audio metadata 54, which may result in audio rendering unit 28B rendering these audio objects 34" in the background as more diffuse objects.

Potential issues related to hearing "above" the illustrated circular plane including audio objects 126A-126K (or a horizontal plane that may include the audio objects 126A-126K) may also arise in the case of object-based representations of the soundfield being rendered. As such, the systems of this disclosure may also improve the user experience of computer-mediated reality systems in the case of the computer-mediated reality systems using object-based representations of the soundfield as well. For instance, the audio playback system 16 may use the steering angle of a VR headset paired with the content consumer device 14, to use the various rotations and orientations illustrated in the view 120 of the soundfield, in order to select the appropriate view for the present steering angle. Aspects of audio object architecture are available at https://en.wikipedia.org/wiki/Digital_audio.

Figure 5:
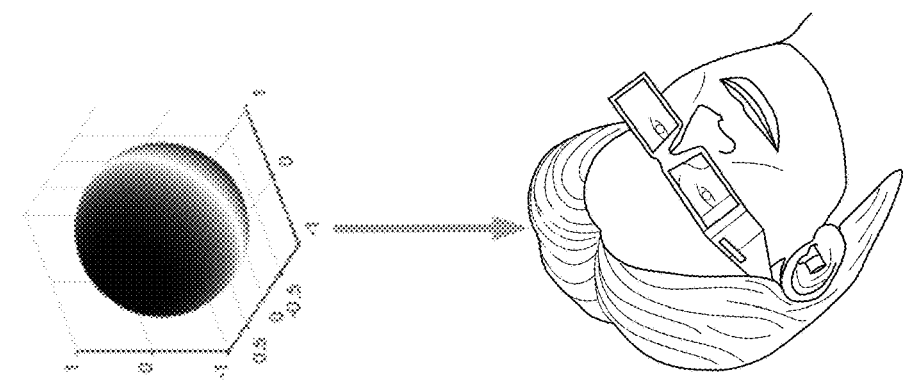
FIG. 5 is a diagram illustrating relationships between the spatial resolutions of various mixed order ambisonic representations of the same soundfield and the corresponding VR steering angles to which the content consumer device 14 may associate each MOA representation.
Figure 5:
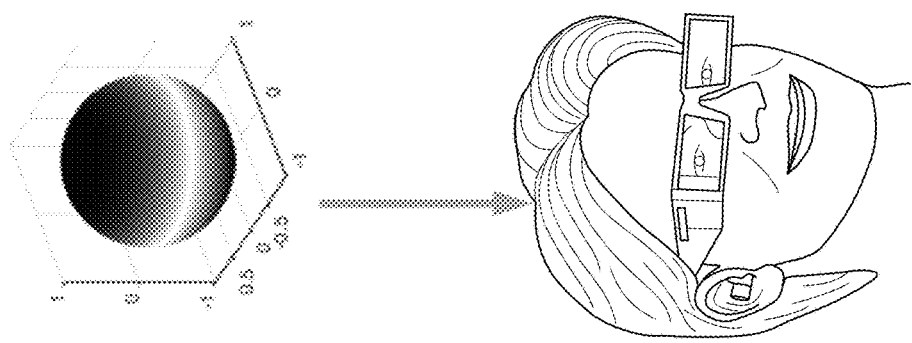
Figure 5:
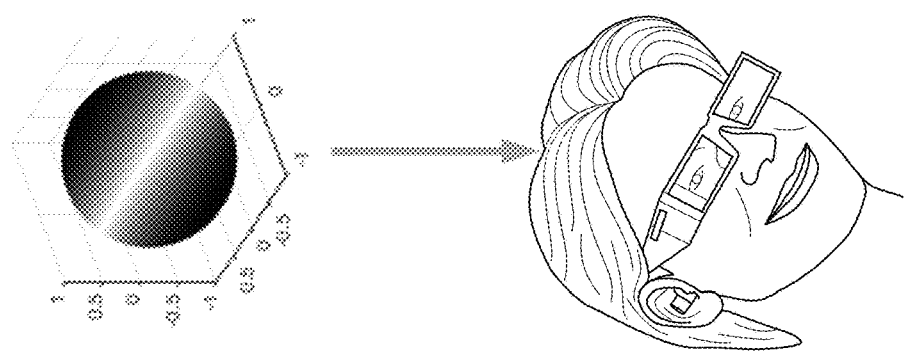

FIG. 5 is a diagram illustrating relationships between the spatial resolutions of various MOA representations of the same soundfield and the corresponding VR steering angles to which the content consumer device 14 may associate each MOA representation. As shown, the content consumer device 14 may associate a steering angle for a straight gaze with an MOA representation that has greater spatial precision in a horizontal region. As also illustrated in FIG. 5, the content consumer device 14 by effectively moving the high resolution region from a vertical region (for the downward gaze) gradually to a horizontal region (for the straight gaze) gradually to a vertical region (for the upward gaze).

Figure 6A:
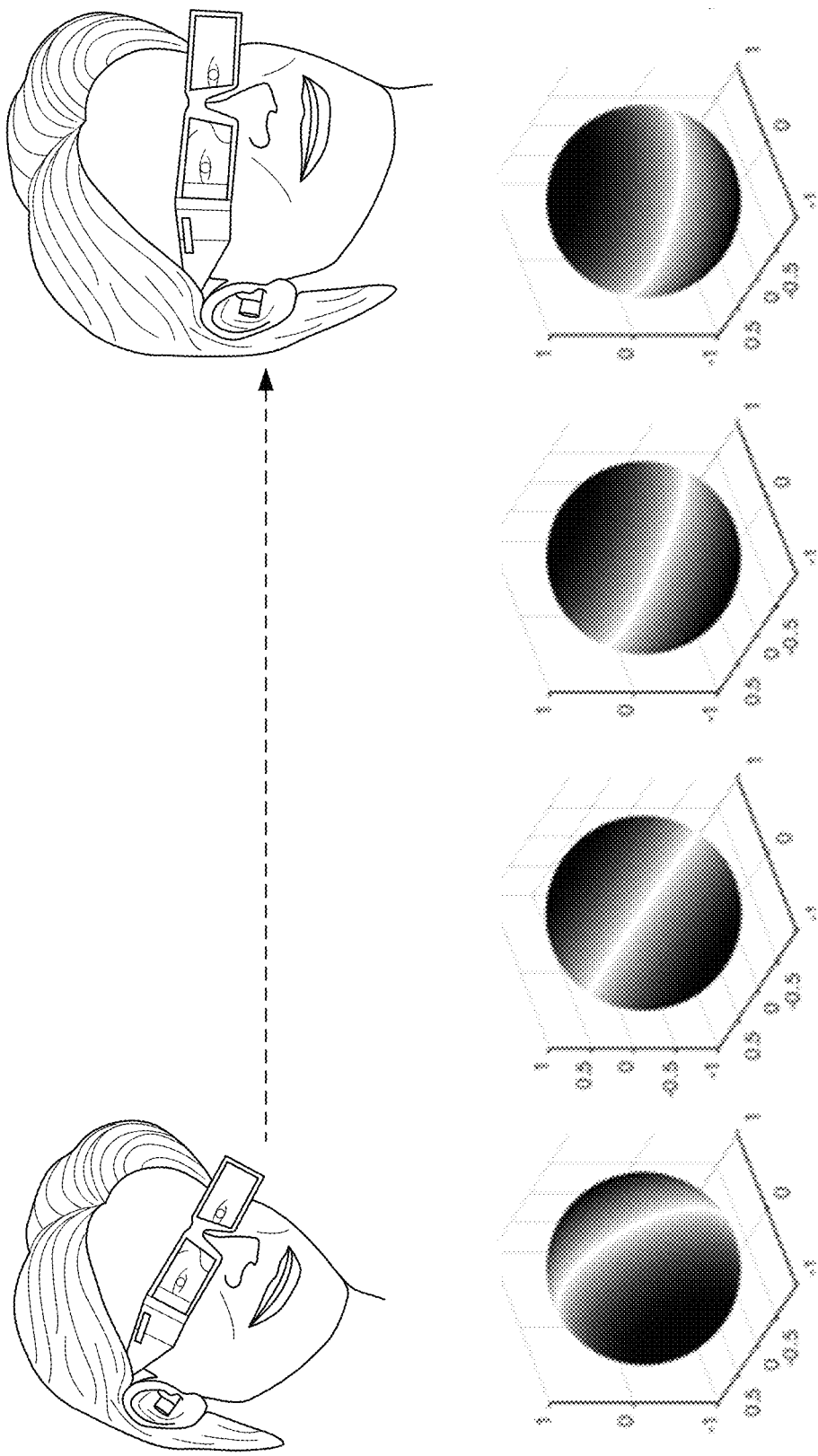
FIGS. 6A and 6B illustrate different mixed order ambisonic representations of the same soundfield that a content consumer device of this disclosure may select, based on the steering angle of a headset.
Figure 6B:
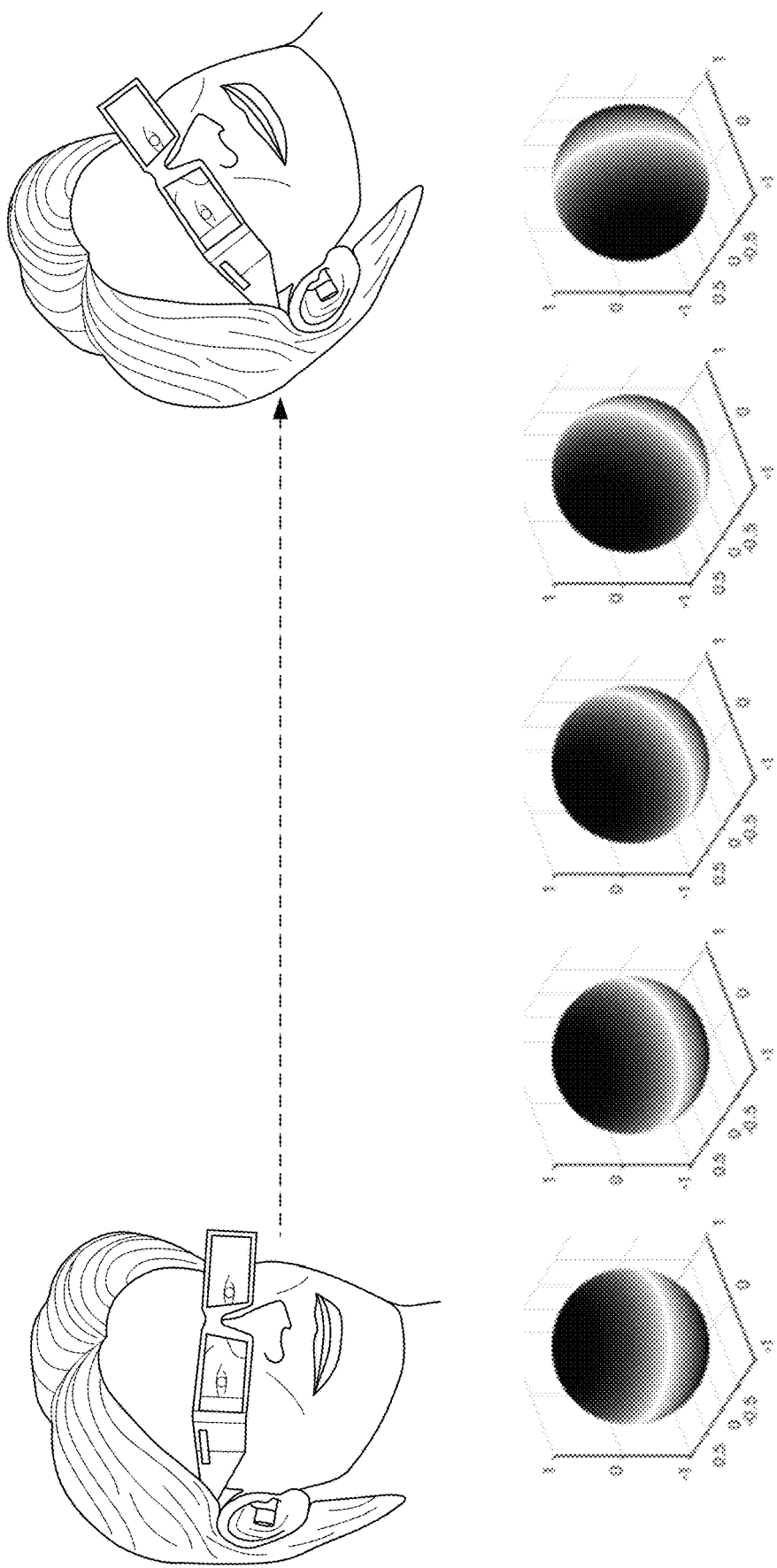

FIGS. 6A and 6B illustrate different MOA representations of the same soundfield that the content consumer device 14 may select, based on the steering angle of the headset. The headset may represent any one or more of a VR headset, an AR headset, an MR headset, or other types of headsets used for computer-mediated reality systems. FIG. 6A illustrates various MOA representations of a single soundfield that the content consumer device 14 may select or request, as the steering angle of the VR headset transitions from a downward gaze to a straight gaze. FIG. 6B illustrates various MOA representations of the same soundfield that the content consumer device 14 may select or request, as the steering angle of the VR headset transitions from a straight gaze to an upward gaze.

As shown in FIGS. 6A and 6B, the content consumer device 14 may cater to the transition in steering angle by effectively moving the high resolution region from a vertical region (for the downward gaze) gradually to a horizontal region (for the straight gaze) gradually to a vertical region (for the upward gaze). As discussed above, all of the MOA representations of FIGS. 6A and 6B may be generated from a full HOA soundfield representation (e.g., by the soundfield representation generator 302 of FIG. 2). Again, the MOA representations have different distributions of high resolution and low resolution areas that match or substantially map to possible viewing directions (FoVs).

Figure 7A:
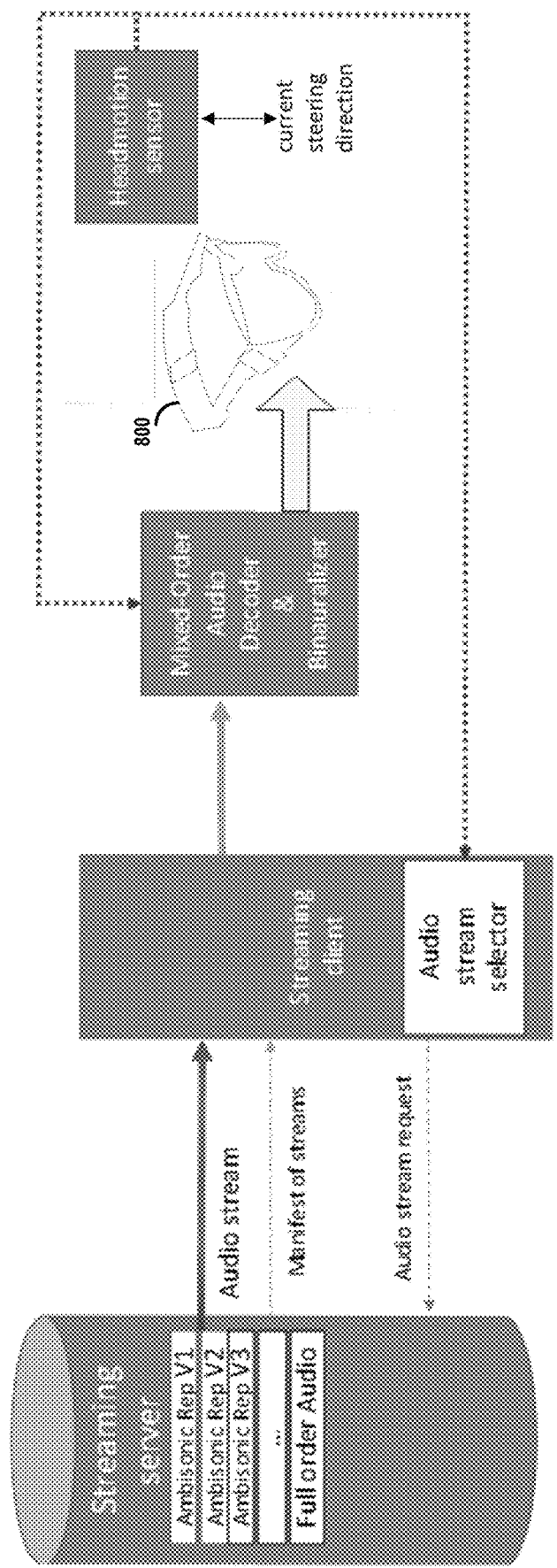
FIGS. 7A and 7B are diagrams illustrating aspects of this disclosure according to which a streaming server or a virtual reality (VR) device may provide particular mixed order ambisonic representations of a soundfield, in response to requests received from a streaming client.
Figure 7B:
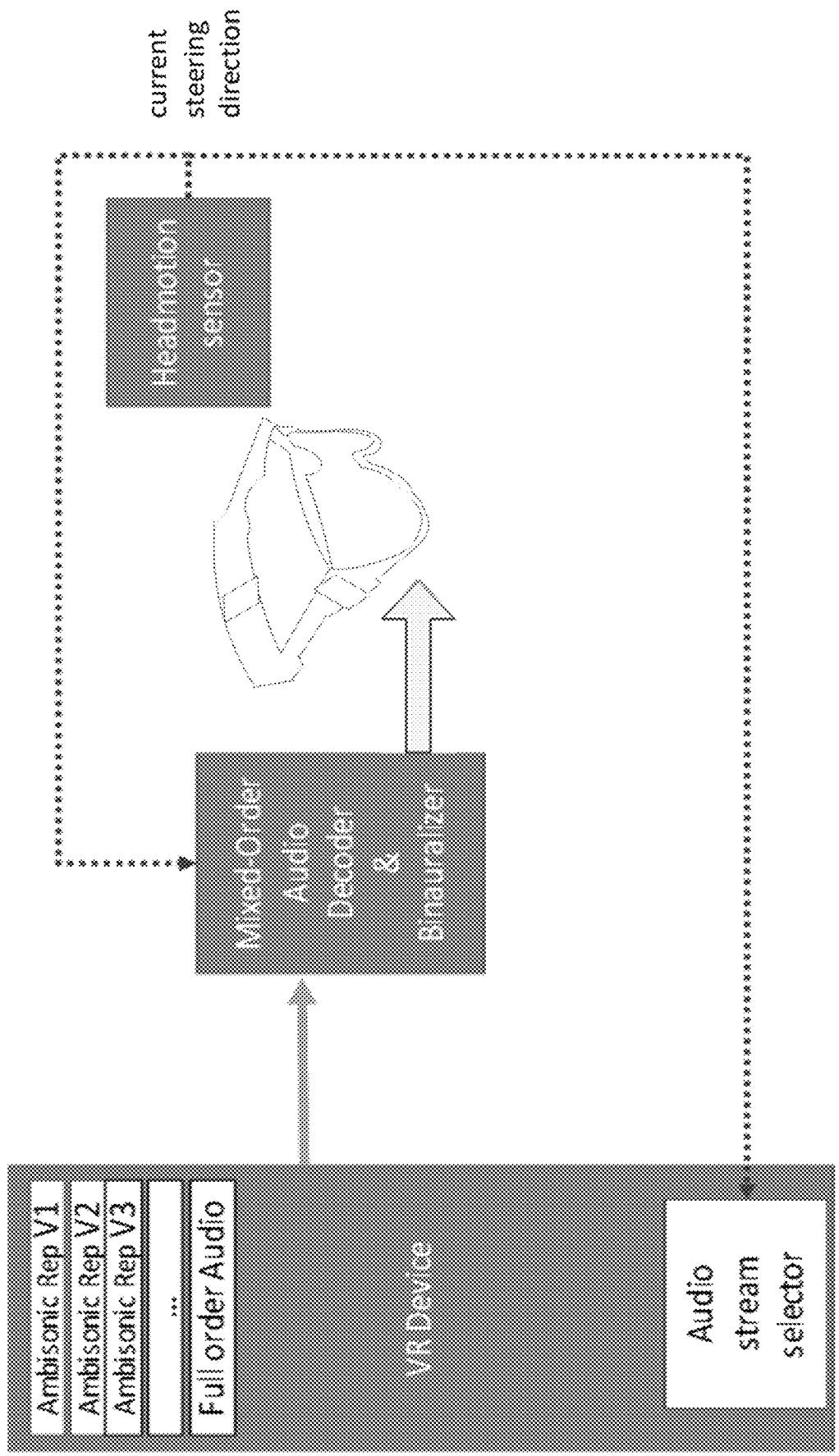

FIGS. 7A and 7B are diagrams illustrating aspects of this disclosure according to which a streaming server or a virtual reality (VR) device or other computer-mediated reality system may provide various representations of a soundfield in the form of an audio stream. In various examples, the streaming server may provide, in the audio stream, a particular mixed order ambisonic representations of a soundfield, in response to requests received from a streaming client. FIG. 7A is a diagram illustrating aspects of this disclosure according to which a streaming server may provide particular representations (e.g., MOA representations and/or a full HOA representations) of a soundfield, in response to requests received from a streaming client. The streaming server of FIG. 7A is an example of the source device 12 of FIG. 2, while the streaming client of FIG. 7A is an example of the content consumer device 14 of FIG. 2. Based on the user's head rotation, the Audio Stream Selector of the streaming client may select a particular MOA stream available from the streaming server.

The streaming server may also provide various types of streams, or combinations of streams, in response to such requests from the streaming clients. For instance, the streaming server may also provide full-order HOA streaming can as an option if requested by streaming client. In other examples, the streaming server may provide one or more of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

FIG. 7A also illustrates a binauralization process, which may be processed locally to provide or in some cases ensure low motion-to-sound latency at the VR headset. In various examples, the streaming server may provide the audio stream as part of a media stream that provides a VR experience, AR experience, MR experience, an extended reality (XR) experience. In some such examples, the streaming server may provide the audio stream in association with a corresponding stream. In some examples, the streaming client may use a network interface to communicate exchange messages to and from the streaming server, where the exchange messages are associated with the representations of the soundfield available from the streaming server. The network interface may be coupled to one or more processors of the streaming client and/or to one or more memory devices of the streaming client. In some examples, the streaming client may use an antenna coupled to the network interface to receive wireless signals including data packets, audio packets, video packets, or transport protocol data associated with the representations of the soundfield that are available from the streaming server. In some examples, the streaming server may further include or be coupled to one or more microphone arrays (e.g., as provided by Eigenmike® technology) that captures one or more portions of the soundfield.

FIG. 7B illustrates aspects of this disclosure according to which a VR device may locally store and thereby provide particular audio representations (e.g., MOA representations and/or a full HOA representation) of a soundfield, such as by way of a direct pairing with a VR headset. The VR device of FIG. 7B is an example of the content consumer device 14 of FIG. 2. Based on the user's head rotation, the Audio Stream Selector of the VR device may select a particular audio representation (e.g. a particular MOA representation or a full HOA representation) available locally. In one example, the VR device may use a manifest of the locally-available audio representations to determine the viability of one or more of the locally-available representations, and then select the appropriate soundfield representation using the information provided in the manifest.

The VR device may include one or more memory devices, such as random access memory (RAM), read-only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store data, instructions, or data structures that can be accessed, retrieved, and processed by a computing device. The VR device may also include a processor (or multiple processors), such as one or more digital signal processors (DSPs), general purpose microprocessors, application specific integrated circuits (ASICs), field programmable gate arrays (FPGAs), or other equivalent integrated, or discrete logic circuitry. The processor the VR device is coupled to the memory device, such as via logical and/or physical channels.

As such, the processor(s) of the VR device of FIG. 7B may track a steering angle, using one or more angles associated with the head rotation information. In turn, the VR device of FIG. 7B may use the steering angle to select a particular representation of the VR audio soundfield from the multiple representations of the same soundfield that are stored to the memory device of the VR device. The processor(s) of the VR device may also reproduce the soundfield using the selected representation, via one or more loudspeakers (e.g. the speakers of the headset 200). In some examples, the processor(s) of the VR device may use one or more sensors and/or cameras (e.g., the sensors and/or cameras of the headset 200) to capture images that indicate a gaze angle of a user wearing the headset 200. For instance, the processor(s) of the VR device may use the gaze angle to determine the steering angle. The processor(s) of the VR device may also represent an image sequence at a viewing angle based on the steering angle. For instance, the processor(s) of the VR device may output portions of the image sequence via the display hardware of the headset 200, at the particular viewing angle that suits the present steering angle of the headset 200.

The memory device of the VR device may also locally store various types of representations, or combinations thereof, in response to such a selection by the Audio Stream Selector executed by the processor(s) of the VR device. For instance, as discussed above, the processor(s) of the VR device may also provide full-order HOA streaming can as an option if selected by the Audio Stream Selector. In other examples, the processor(s) of the VR device may output, via the speaker hardware of the headset 200, one or more of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield. In some examples, one or more of the soundfield representations stored to the memory device of the VR device may include at least one high-resolution region and at least one lower-resolution region, and wherein the selected presentation based on the steering angle provides a greater spatial precision with respect to the at least one high-resolution region and a lesser spatial precision with respect to the lower-resolution region. FIG. 7B also illustrates a binauralization process, which may be processed locally to provide or in some cases ensure low motion-to-sound latency at the VR headset.

Figure 8:
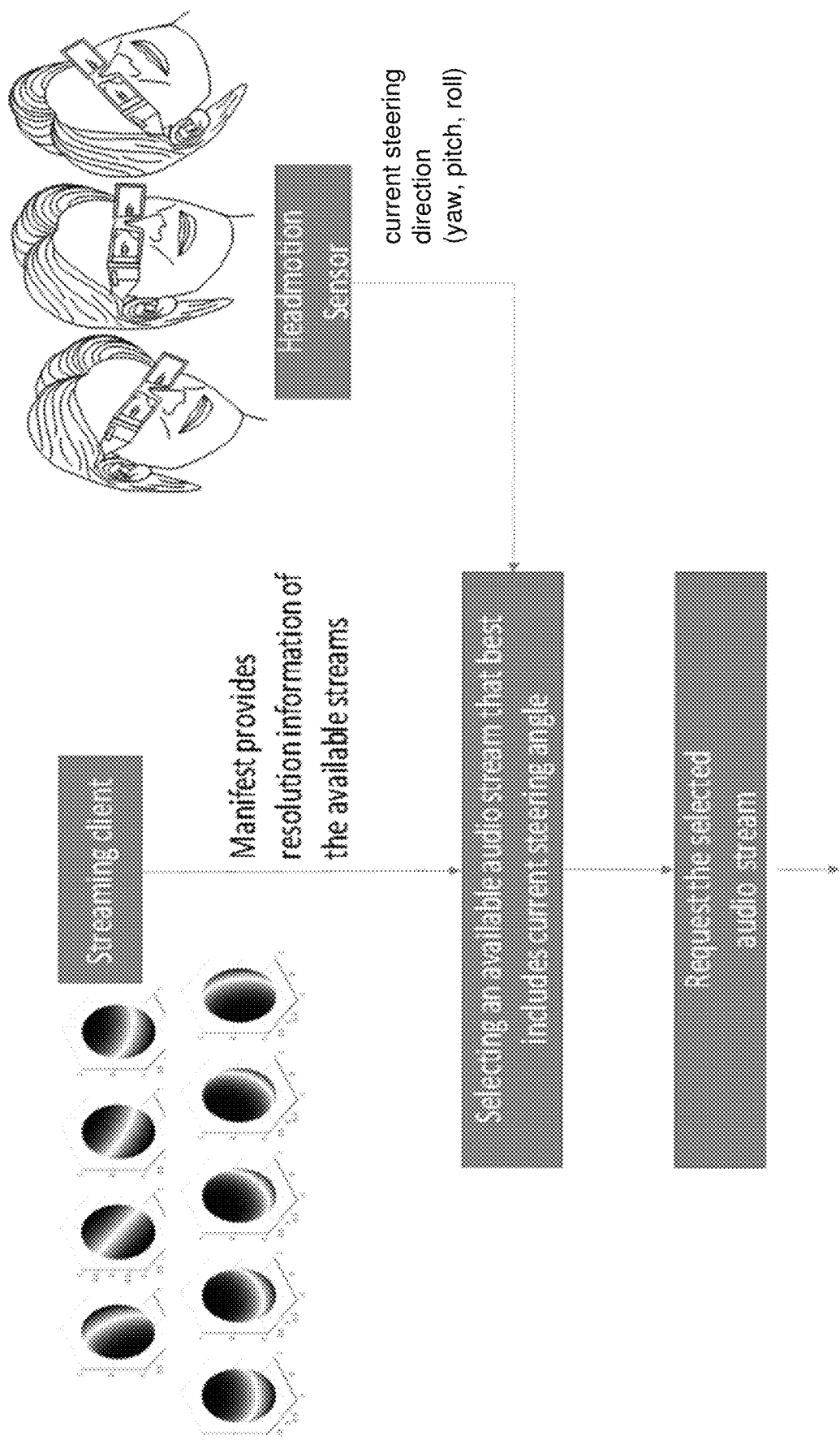
FIG. 8 is a diagram illustrating an algorithm that may be performed by the audio stream selector of FIG. 7 in order to request streaming of a particular soundfield representation based on the steering angle of a headset.
Figure 9A:
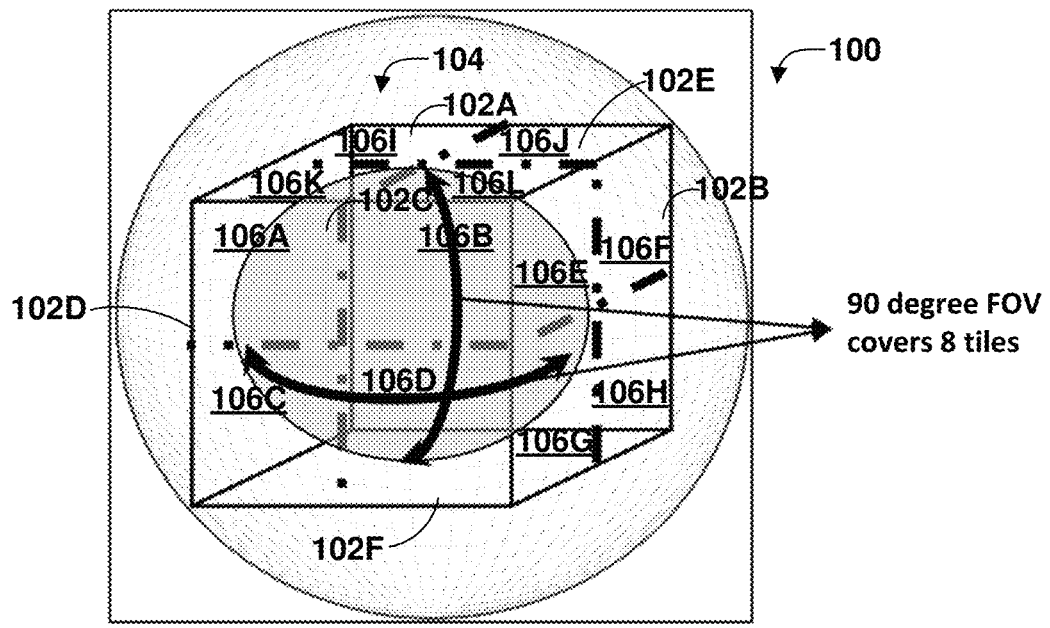
FIGS. 9A and 9B are diagrams illustrating representations of models for displays used to present panoramic video data.
Figure 9B:
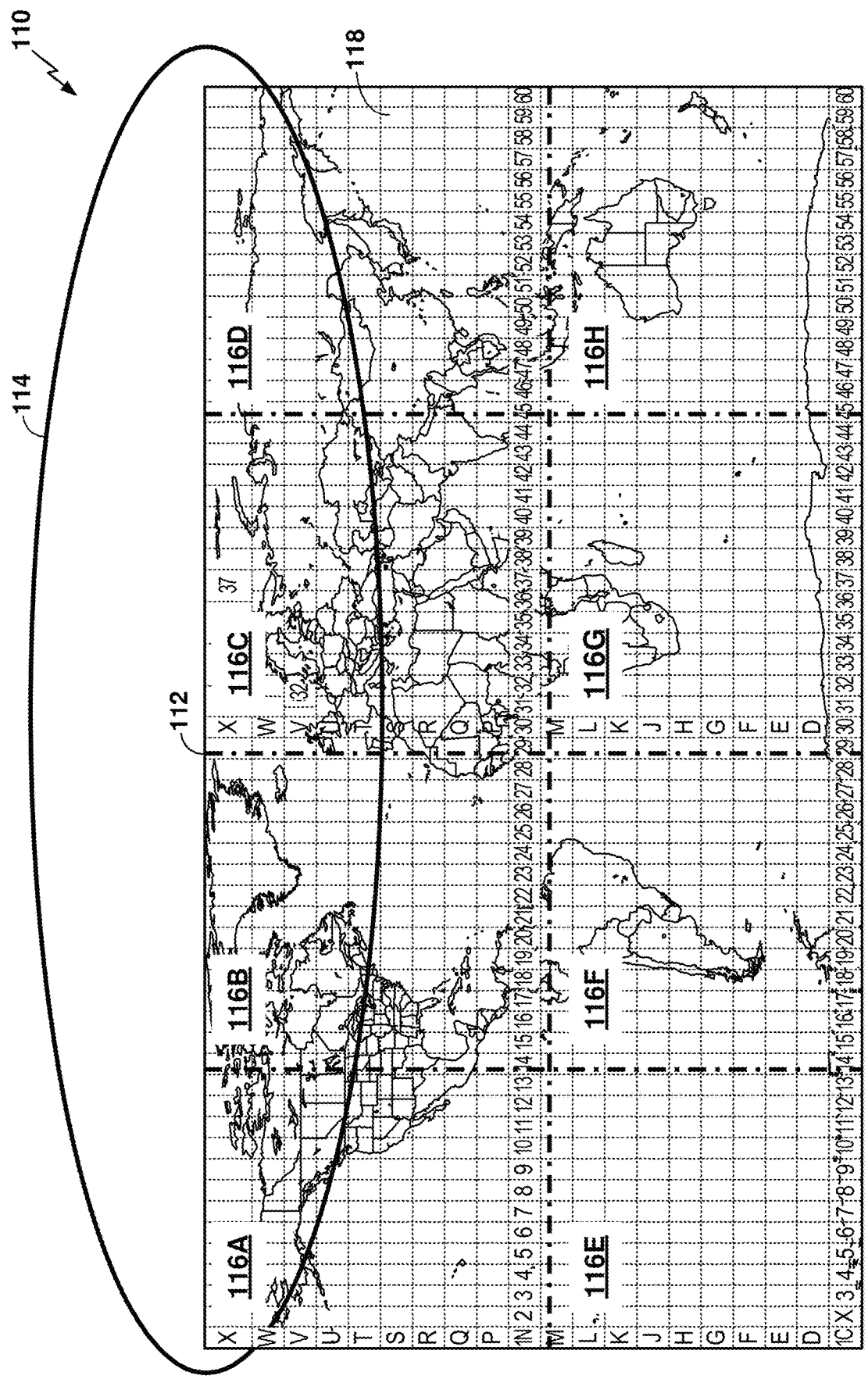

FIG. 8 is a diagram illustrating an algorithm that may be performed by the audio stream selector of FIG. 7 in order to request streaming of a particular soundfield representation based on the steering angle of a headset. The headset may represent any one or more of a VR headset, an AR headset, an MR headset, or other types of headsets used for computer-mediated reality systems. As illustrated, the streaming client (e.g., a VR client device) may have access to a manifest that provides resolution information of the streams available from the streaming server (e.g., a VR server). The available streams may include various representations, such as MOA representations with precision concentrated in different regions, and may optionally include a full third order HOA representation and/or an object-based representation of the soundfield. In turn, the audio stream selector may select an available stream, such as particular MOA representation (or the full HOA representation or the object-based representation) of the soundfield, to suit the last-detected steering angle of the VR headset. In turn, the streaming client may request the selected stream from the streaming server. For instance, the streaming client may identify the requested stream using identification information available from the manifest. While FIGS. 9A and 9B are diagrams illustrating representations of models for displays used to present panoramic video data. FIG. 9A illustrates an example of a cube map projection 100, while FIG. 9B illustrates equi-rectangular projection 110.

In FIG. 9A, each of 6 faces 102A-102F (faces 102) of cube 104 is divided into four tiles (for a total of 24 tiles). Tiles of visible faces (i.e., faces 102A, 102B, and 102C) are labeled as tiles 106A-106L. In particular, face 102C is divided into tiles 106A-106D, face 102B is divided into tiles 106E-106H, and face 102A is divided into tiles 106I-106L.

The tiles of the hidden faces (i.e., faces 102D, 102E, and 102F) are unlabeled in FIG. 9A for purposes of readability, but it should be understood that faces 102D-102F are also divided into tiles. "Tiles" may also be referred to as regions. Each of cube faces 102 in FIG. 9A corresponds to a 90 degree by 90 degree field of view (FoV). Any arbitrary 90×90 degree tile of the sphere may require decoding of $\frac{1}{3}^{rd}$ of the panorama at high resolution. The FoV rarely spans more than eight tiles. Thus, the span of high resolution decode can be restricted to eight tiles or less, without losing visual quality.

FIG. 9B illustrates canvas 118, which is divided into eight tiles 116A-116H. In this example, when a user is looking at the "poles" of the sphere (e.g., north pole 112, where the user's field of view when looking at north pole 112 is represented by grey shaded area 114), the entire upper half of canvas 118 (i.e., tiles 116A-116D) would need to be decoded at high resolution. Breaking tiles 116A-116D up into more vertical tiles would not help to solve the problem. Thus, in this example, half of the panorama would need to be decoded at high resolution. This is significantly more high resolution data than in the example of FIG. 9A. Therefore, the techniques of this disclosure may use cube map projection model 100 for the display.

Referring to the example discussed with respect to FIG. 1 above, in which video data is coded at resolutions including 6k, 4k, HD (1080p), and 720p, in FIG. 9A, front four tiles 106A-106D (also referred to as "regions") may be decoded at 6k resolution, neighboring eight tiles (e.g., tiles 106E, 106G, 106K, and 106L, as well as the unlabeled tiles of faces 102D and 102F that neighbor tiles 106A, 106C, and 106D) may be decoded at 4k resolution, neighboring eight tiles to these eight tiles (i.e., tiles 106F, 106H, 106I, 106J, and the other unlabeled tiles that neighbor the tiles that neighbor tiles 106A, 106C, and 106D) may be decoded at HD (1080p) resolution, and the four back tiles may be decoded at 720p resolution. In this example, the total bandwidth requirement for such video data would be 6.5 MP per frame. In a worse-case scenario in which there is an 8-4-4-8 distribution of tiles across the resolutions in decreasing order, there would be 8.17 MP per frame. It will be appreciated that the video resolutions/rates described above are non-limiting examples, and that other video resolutions/rates are also compatible with various aspects of this disclosure. It will also be appreciated that video resolutions/rates are subject to change as technology and standards evolve.

Figure 10:
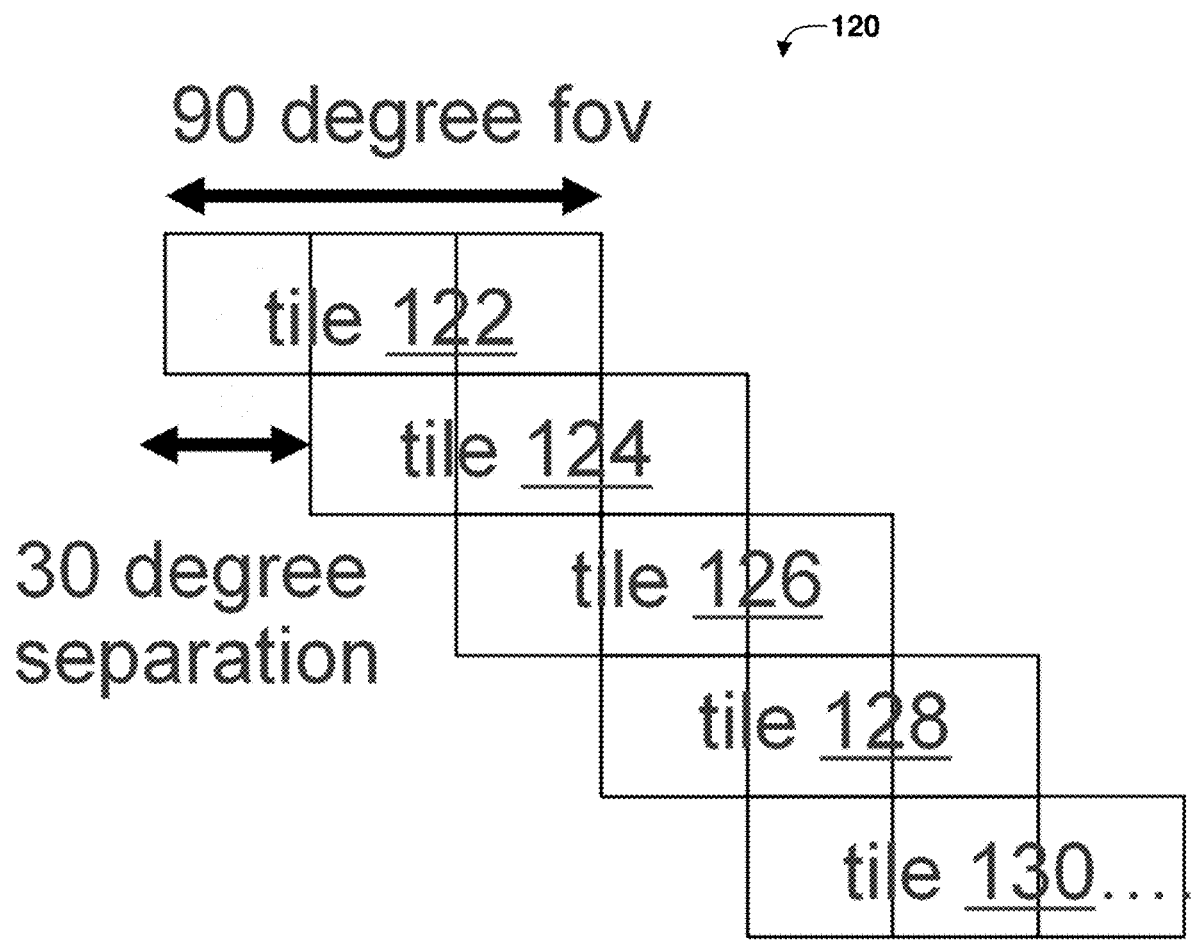
FIG. 10 is a diagram illustrating an example of cylindrical panorama video data.

FIG. 10 is a diagram illustrating an example of cylindrical panorama video data 120. Cylindrical panorama video data 120 is partitioned into tiles 122-130. Bit rate reductions may be equally, if not more, important for certain uses than reductions in decoder complexity. For example, some reports indicate that the average U.S. Internet connection speed is 5 mbps, compared to a 30 mbps requirement for conventional, high quality panoramic video data. Carving up multiple small tiles from the panorama may reduce compression efficiency. That is, there may be some loss in temporal prediction efficiency.

In the example of FIG. 10, the server (e.g., source device 12 of FIG. 1 or source device 50 of FIG. 2) may store 12×90 degree tiles 122-130 (which is equivalent to three copies of the panorama). This example may be used to avoid small tiles, which means that compression efficiency is not compromised. In addition, 12×30 degree tiles may also be stored. An arbitrary 90 degree view would then require at the most four 30 degree tiles, where one 30 degree tile and one 90 degree tile can be used to compose an arbitrary 90 degree view.

A bitrate optimization for spherical panorama video data 120 may be achieved using the techniques of this disclosure. The idea of trading off storage space to save bitrate can be generalized to other cases. For instance, it is not necessary that same tile granularity is available at all the viewing angles. Unlike the cylindrical panorama case, covering all the viewpoints with equal tile granularity is not trivial for spherical panoramas.

In general, source device 12 of FIG. 2 may save copies of spherical panorama video data 120 at multiple tile granularities. Bigger tiles than tiles 122-130 (not shown) can have overlapping fields of views between them in some places for better coverage. For example, source device 12 may encode the most interesting viewpoints (as determined by a user, such as an administrator, who is preparing the content) at larger tile sizes. In this manner, source device 12 may send a combination of multiple sized tiles, e.g., a large tile (e.g., four times the tile size of one of tiles 122-130) for a region at which a visual focus of a user is directed, and smaller tiles for the other remaining regions (for a total of 21 tiles, with respect to the example of FIG. 9A).

An example tile coding in the cuboidal projection may be as follows: cube faces may be A, B, C, and D, forming the horizontal ring, E for the top, and F for the bottom. The smallest tiles may be A1, A2, A3, A4, B1, B2, . . . , F1, F2, F3, and F4 (for a total of 24 tiles). The larger tiles may be A, B, C, D, E, and F (where tile A covers the area spanned by tiles A1, A2, A3, and A4, B covers the area spanned by tiles B1, B2, B3, and B4, and so on for each of tiles C-F). In some examples, only those viewpoints which are more likely to be viewed would be coded at larger tile sizes. Thus, if it is unlikely that a user would look up or down, only A, B, C, and D could be coded as large tiles. Optionally, each of these tiles may have left and right views for stereo video data.

Source device 12 may prepare the video data for a stereo video case to improve latency when destination device 14 switches from a low resolution stream to a high resolution stream. The techniques of this disclosure may avoid introduction of additional motion to photon (m2p) latency. In general, latency during the transition from, e.g., low resolution to high resolution (when the user moves his/her head) can be large. The maximum latency is equal to the latency from a heads up display (HUD) to server and back (e.g., the roundtrip latency between destination device 14 and server device 12) plus the length of a GOP structure or time until next I-frame is decoded. However, the scenario where content at different resolutions is available at the HUD (either stored locally in a file or streamed) causes the network delay portion to be 0 in the maximum latency calculation above.

Although generally discussed with respect to source device 12 of FIG. 1, it should be understood that source device 50 of FIG. 2 may perform substantially similar techniques as discussed with respect to FIG. 10.

Figure 11:
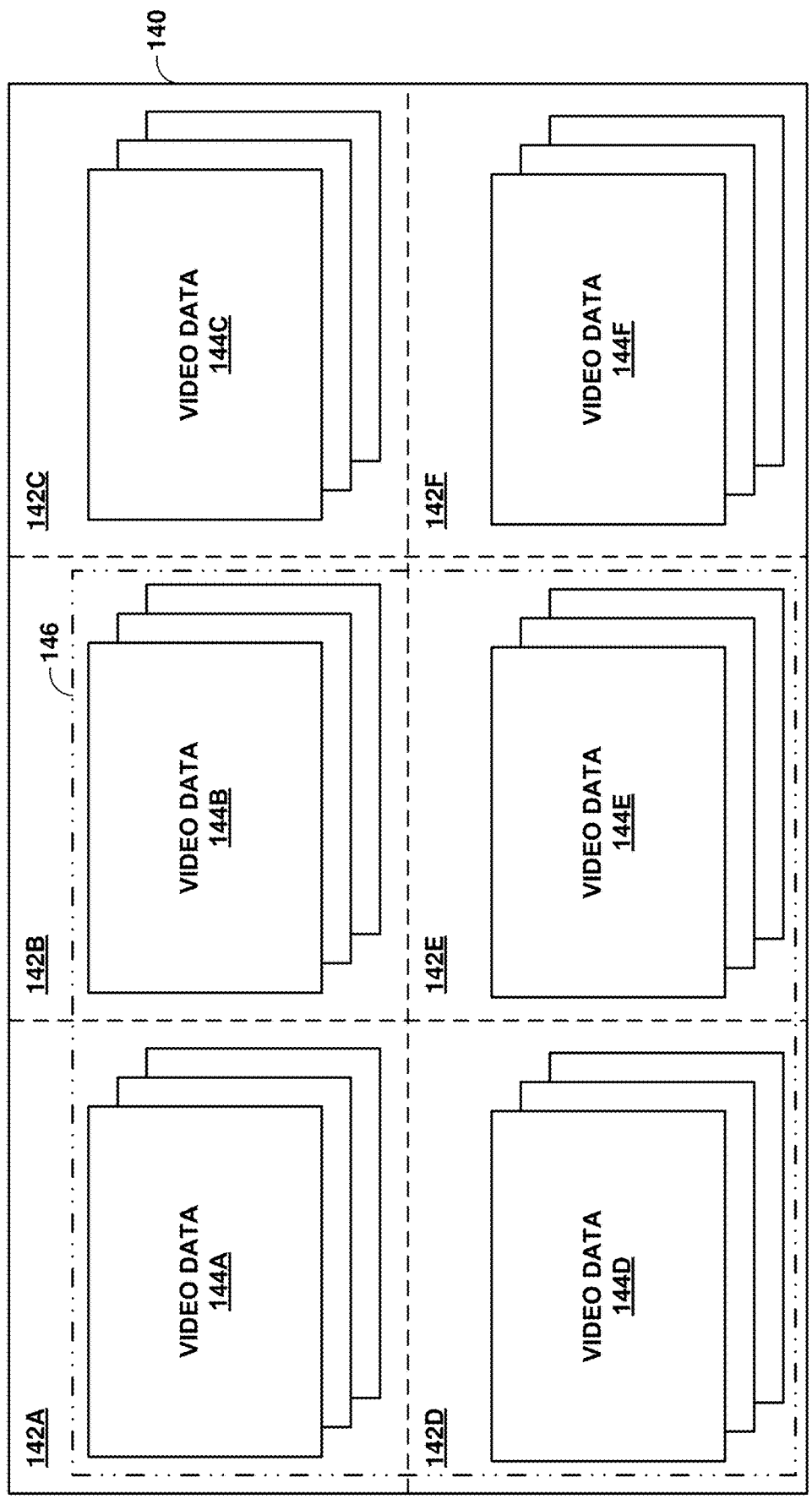
FIG. 11 is a diagram illustrating an example canvas divided into regions.

FIG. 11 is a diagram illustrating an example canvas 140 divided into regions 142A-142F (regions 142). For purposes of discussion, canvas 140 is divided as a rectangle into rectangular regions 142, although it should be understood that this discussion may apply to a cube map projection similar to cube map projection 100 as shown in FIG. 9A.

In accordance with the techniques of this disclosure, various sets of video data may be provided for each of regions 142. In the example of FIG. 11, video data 144A is provided for region 142A, video data 144B is provided for region 142B, video data 144C is provided for region 142C, video data 144D is provided for region 142D, video data 144E is provided for region 142E, and video data 144F is provided for region 142F. Each of video data 144A-144F may include video data encoded at a variety of quality levels, e.g., spatial resolutions. For example, each of video data 144A-144F may include video data encoded at proportional 6K resolution (that is, having pixel density of 6K resolution), 4K resolution, 1080P resolution, and 720P resolution.

In some examples, video data may be provided that covers a plurality of regions 142. In the example of FIG. 11, video data 146 is provided that covers regions 142A, 142B, 142D, and 142E. Thus, if a user's focus is directed at a field of view including regions 142A, 142B, 142D, and 142E, destination device 14 may simply retrieve video data 146, rather than retrieving individual sets of video data from video data 144A, 144B, 144D, 144E. In some examples (such as that shown in FIG. 11), only a single quality (e.g., spatial resolution) is provided that covers multiple regions, although in other examples, multiple qualities may be provided for multiple regions.

Figure 12:
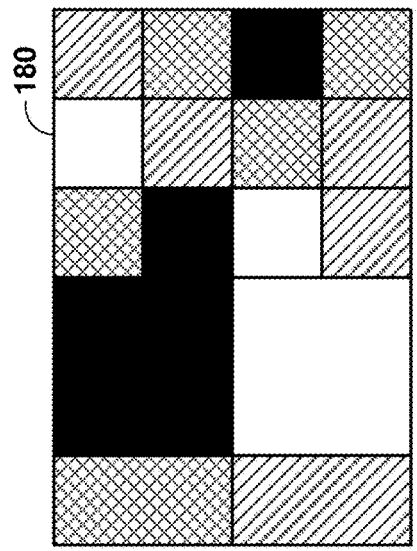
FIG. 12 is a diagram illustrating a correspondence between an example canvas and corresponding cube map views.
Figure 12:
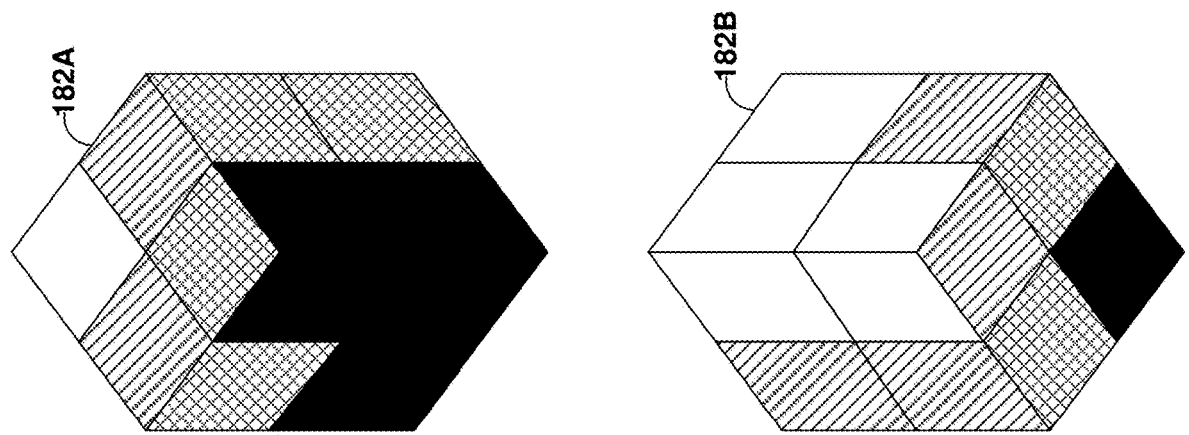

FIG. 12 is a diagram illustrating a correspondence between an example canvas 180 and corresponding cube map views 182A, 182B. In particular, canvas 180 includes a plurality of tiles that are differently shaded, where different shading represents different quality levels (e.g., spatial resolutions) that are requested. Cube map views 182A, 182B represent where each of the tiles of canvas 180 would be displayed. Cube map view 182A shows a front perspective view of front views of the cube map, while cube map view 182B shows a cut-away front perspective of rear tiles of the cube map. White tiles represent a highest quality level (e.g., highest spatial resolution), diagonally shaded tiles represent a second highest quality level, cross-hatch shaded tiles represent a third highest quality level, and solid black shaded tiles represent a lowest quality level. The quality levels may also be referred to as "layers."

In one example, to achieve lower quality levels, spatial resolution is downsampled. For example, layer 1 may be full spatial resolution, layer 2 may be spatially reduced by one-half in the horizontal and vertical directions (for a total of one-quarter spatial resolution), layer 3 may be spatially reduced by one-third in the horizontal and vertical directions (for a total of one-ninth spatial resolution), and layer 4 may be spatially reduced by one-fourth in the horizontal and vertical directions (for a total of one-sixteenth spatial resolution).

Figure 13:
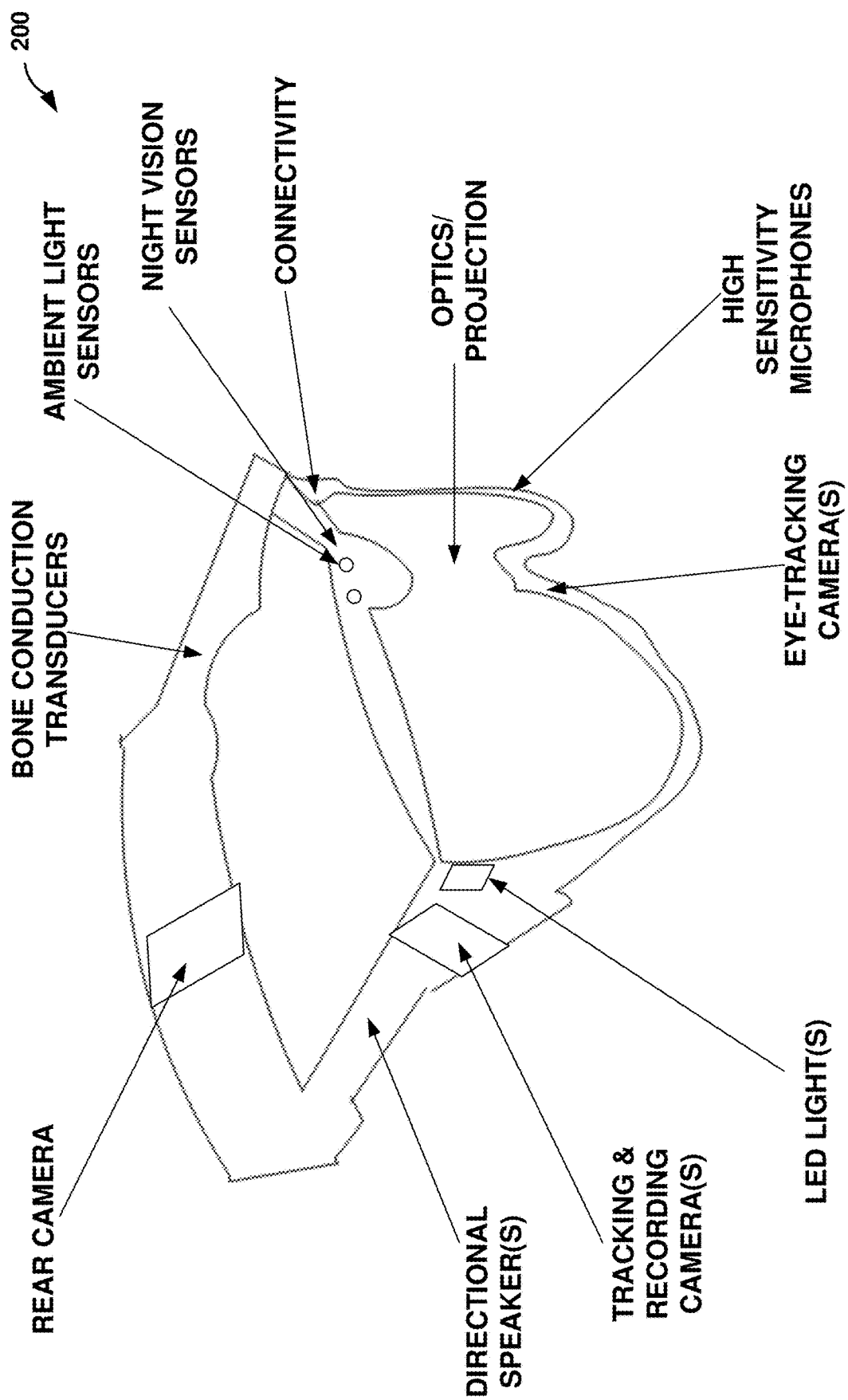
FIG. 13 is a diagram illustrating an example of a headset that one or more computer-mediated reality systems of this disclosure may use.

FIG. 13 is a diagram illustrating an example of a headset 200 that one or more computer-mediated reality systems of this disclosure may use. In various examples, the headset 200 may represent a VR headset, an AR headset, an MR headset, or an extended reality (XR) headset. As shown, the headset 200 includes a rear camera, one or more directional speakers, one or more tracking and/or recording cameras, and one or more light-emitting diode (LED) lights. In some examples, the LED light(s) may be referred to as "ultra bright" LED light(s). In addition, the headset 200 includes one or more eye-tracking cameras, high sensitivity audio microphones, and optics/projection hardware. The optics/projection hardware of the headset 200 may include durable semi-transparent display technology and hardware.

The headset 200 also includes connectivity hardware, which may represent one or more network interfaces that support multimode connectivity, such as 4G communications, 5G communications, etc. The headset 200 also includes ambient light sensors, and bone conduction transducers. In some instances, the headset 200 may also include one or more passive and/or active cameras with fisheye lenses and/or telephoto lenses. Various devices of this disclosure, such as the content consumer device 14 of FIG. 2 may use the steering angle of the headset 200 to select an audio representation of a soundfield to output via the directional speaker(s) of the headset 200, in accordance with various techniques of this disclosure. It will be appreciated that the headset 200 may exhibit a variety of different form factors.

Figure 14:
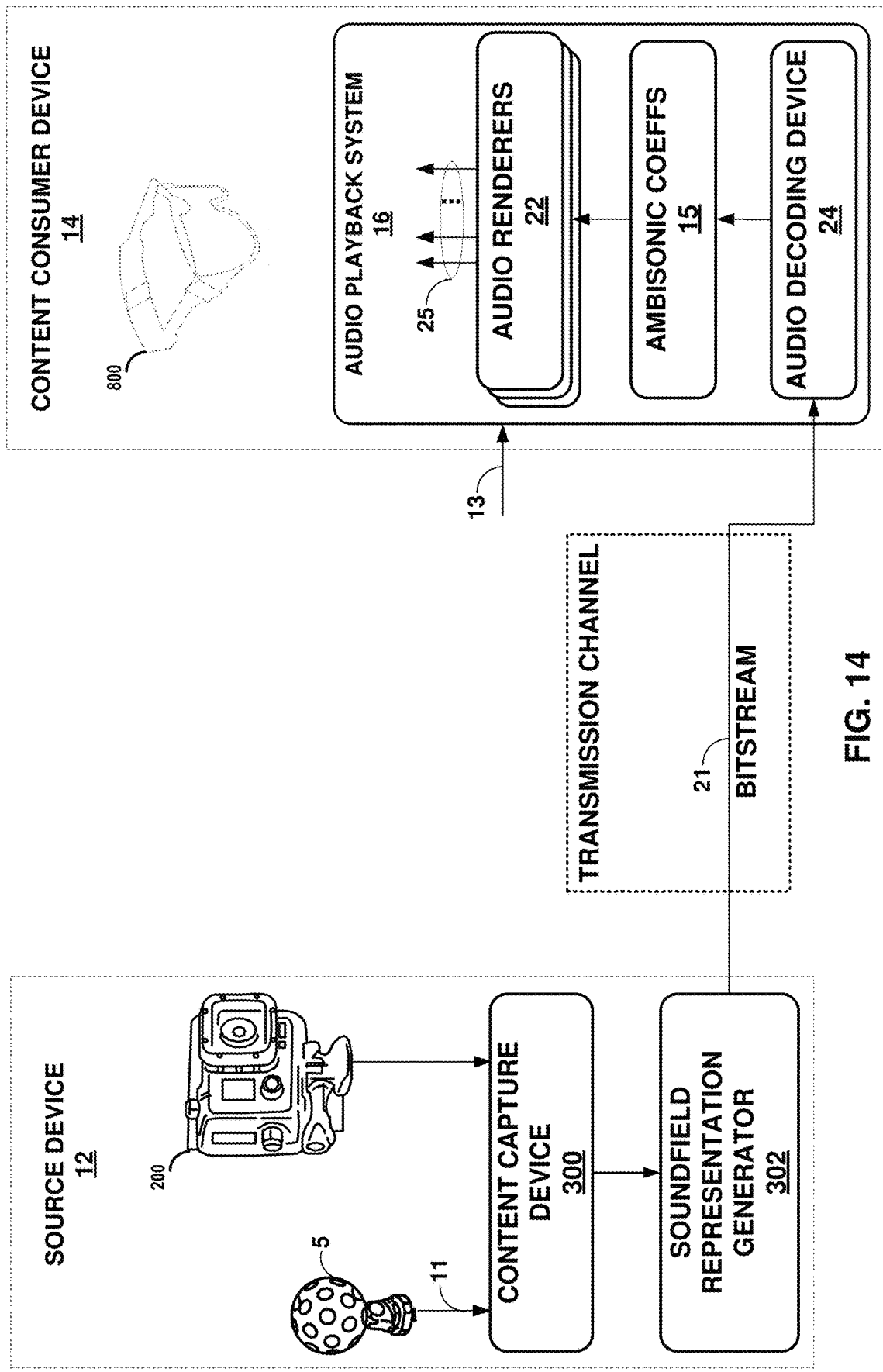
FIG. 14 is a diagram illustrating another example of a system that may perform various aspects of the techniques described in this disclosure.

FIG. 14 is a diagram illustrating another example of a system that may perform various aspects of the techniques described in this disclosure. FIG. 14 illustrates an example in which the source device 12 further includes a camera 200. The camera 200 may be configured to capture video data, and provide the captured raw video data to the content capture device 300. The content capture device 300 may provide the video data to another component of the source device 12 (not shown in FIG. 14), for further processing into viewport-divided portions, such as the tiles 116 illustrated in FIG. 9B.

In the example of FIG. 14, the content consumer device 14 also includes the headset 200. It will be understood that, in various implementations, the headset 200 may be included in, or externally coupled to, the content consumer device 14. As discussed above with respect to FIG. 13, the headset 200 includes display hardware and speaker hardware for outputting video data (e.g., as associated with various viewports) and for rendering audio data.

Figure 15:
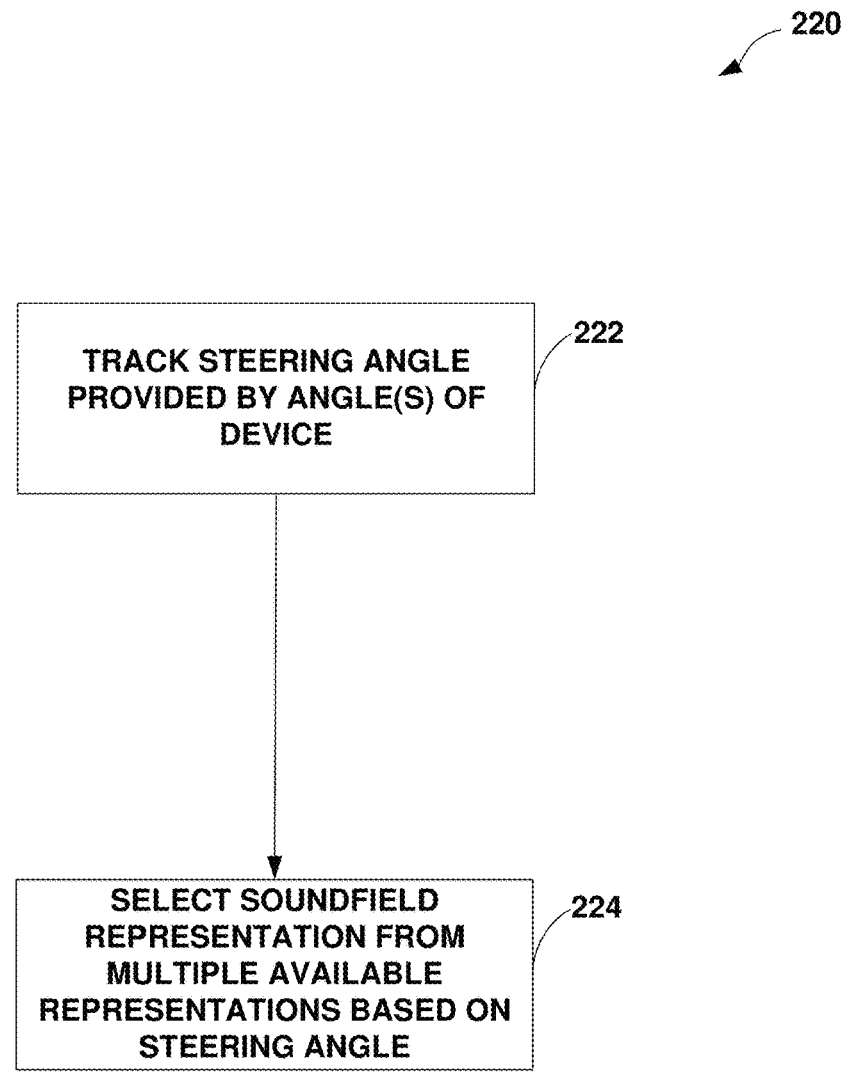
FIG. 15 is a flowchart illustrating an example process that a computer-mediated reality device may perform, in accordance with one or more aspects of this disclosure.

FIG. 15 is a flowchart illustrating an example process 220 that a VR device may perform, in accordance with aspects of this disclosure. In various examples, the streaming client of FIG. 7A or the VR device of FIG. 7B may perform process 220, whether as a standalone process or as part of a larger process. Process 220 may begin when the VR device tracks a steering angle provided by one or more angles of a device (222). For instance, the VR device may track the steering angle of the headset 200 illustrated in FIG. 13. In turn, the VR device may select a soundfield representation from multiple available representations (of the same soundfield) based on the tracked steering angle (224). For instance, the VR device may select one of the ambisonic (e.g., MOA or HOA) representations stored locally as shown in FIG. 7B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In some examples, the headset 200 may capture, using camera hardware, images that include a gaze angle associated with a user wearing the headset 200. In some examples, the VR device may determine, using one or more processors, the gaze angle associated with the user, and may track the steering angle based on the gaze angle. In some examples, a display of the headset 200 may represent an image sequence at a viewing angle that is based on the steering angle.

In some examples, the VR device (or the streaming device) may communicate, using a network interface coupled to a memory of the VR/streaming device, exchange messages to an external device (e.g., the streaming server of FIG. 7A), where the exchange messages are associated with the multiple available representations of the soundfield. In some examples, the VR device may receive, using an antenna coupled to the network interface, wireless signals including data packets, audio packets, video pacts, or transport protocol data associated with the multiple available representations of the soundfield. In some examples, one or more microphone arrays may capture the soundfield.

In some examples, the multiple available representations of the soundfield stored to the memory device may include a plurality of object-based representations of the soundfield, higher order ambisonic representations of the soundfield, mixed order ambisonic representations of the soundfield, a combination of object-based representations of the soundfield with higher order ambisonic representations of the soundfield, a combination of object-based representations of the soundfield with mixed order ambisonic representations of the soundfield, or a combination of mixed order representations of the soundfield with higher order ambisonic representations of the soundfield.

In some examples, one or more of the soundfield representations of the multiple available representations of the soundfield may include at least one high-resolution region and at least one lower-resolution region, and wherein the selected presentation based on the steering angle provides a greater spatial precision with respect to the at least one high-resolution region and a lesser spatial precision with respect to the lower-resolution region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising:
   a memory configured to store a plurality of representations of a soundfield, each representation of the soundfield comprising a different set of ambisonic coefficients representative of the same soundfield; and
   a processor, coupled to the memory, the processor configured to perform audio playback based on a field of view and on a particular representation of the soundfield from the plurality of representations.

2. The device of claim 1, wherein the field of view is based on a gaze angle.

3. The device of claim 2, further comprising a camera configured to capture images that include the gaze angle.

4. The device of claim 3, wherein the processor is coupled to the camera, and wherein the processor is configured to determine the gaze angle and track a steering angle based on the gaze angle.

5. The device of claim 1, wherein the field of view is based on a steering angle.

6. The device of claim 5, wherein the processor is configured to:
   track the steering angle provided by one or more angles associated with a gaze angle; and
   select, based on the steering angle, the particular representation of the soundfield from the plurality of representations.

7. The device of claim 5, further comprising a display configured to represent an image sequence at a viewing angle that is based on the steering angle.

8. The device of claim 5, wherein one or more of the plurality of the representations of the soundfield stored to the memory include, at least one high-resolution region and at least one lower-resolution region, and wherein the particular representation selected based on the steering angle provides a greater spatial precision with respect to the at least one high-resolution region and a lesser spatial precision with respect to the lower-resolution region.

9. The device of claim 5, wherein the device is configured to select the steering angle of the device as the device transitions from a downward gaze to a straight gaze, where the straight gaze is associated with an ambisonic representation that has greater spatial precision in a horizontal region than a vertical region associated with the downward gaze.

10. The device of claim 5, wherein the device is configured to select the steering angle of the device as the device transitions from a straight gaze to an upward gaze, where the upward gaze is associated with an ambisonic representation that has greater spatial precision in a vertical region than a horizontal region associated with the straight gaze.

11. The device of claim 1, further comprising one or more loudspeakers coupled to the processor, the one or more loudspeakers configured to reproduce the soundfield based on the particular representation of the soundfield selected from the plurality of representations.

12. The device of claim 1, further comprising a network interface, coupled to the memory, configured to communicate exchange messages to an external device associated with the plurality of representations of the soundfield.

13. The device of claim 12, further comprising an antenna, coupled to the network interface, configured to receive wireless signals including data packets, audio packets, video packets, or transport protocol data associated with the plurality of representations of the soundfield.

14. The device of claim 1, wherein the plurality of representations of the soundfield stored to the memory device comprises one or more of higher order ambisonic representations of the soundfield, mixed order ambisonic representations of the soundfield, and a combination of mixed order representations of the soundfield with higher order ambisonic representations of the soundfield.

15. The device of claim 1, wherein the device comprises one of a virtual reality headset, a mixed reality headset or an augmented reality headset.

16. The device of claim 1, further comprising one or more microphone arrays configured to capture the soundfield.

17. The device of claim 1,
   wherein the different set of ambisonic coefficients each have different precisions in different spatial locations, and
   wherein the processor is configured to select the particular representation of the soundfield form the plurality of representations in which the corresponding one of the different set of ambisonic coefficients have the highest precision in the spatial locations that most closely aligns with the field of view.

18. A method comprising:
   storing, to a memory, a plurality of representations of a soundfield, wherein each representation of the soundfield comprises a different set of ambisonic coefficients representative of the same soundfield; and
   performing an audio playback that is customized based on a field of view and on a particular representation of the soundfield from the plurality of representations.

19. The method of claim 18, wherein the field of view is based on a gaze angle.

20. The method of claim 18, wherein the field of view is based on a steering angle.

21. The method of claim 20, further comprising:
   tracking, by a processor in communication with the memory, the steering angle provided by one or more angles associated with a gaze angle; and selecting, by the processor and based on the steering angle, a particular representation of the soundfield from the plurality of representations.

22. The method of claim 20, further comprising displaying an image sequence at a viewing angle that is based on the steering angle.

23. A non-transitory computer-readable storage medium encoded with instructions that, when executed, cause a processor of a device to:
  store, to the non-transitory computer-readable storage medium, a plurality of representations of a soundfield, each representation of the soundfield comprising a different set of ambisonic coefficients representative of the same soundfield; and
  perform audio playback based on a field of view and on a particular representation of the soundfield from the plurality of representations.

24. The non-transitory computer-readable storage medium of claim 23, encoded with instructions that, when executed, cause the processor of the device to determine a steering angle, wherein the steering angle is the field of view.

* * * * *